(12) United States Patent
Yang et al.

(10) Patent No.: US 11,863,600 B2
(45) Date of Patent: Jan. 2, 2024

(54) TECHNIQUES FOR EFFICIENT COMMUNICATION DURING A VIDEO COLLABORATION SESSION

(71) Applicant: Dropbox, Inc., San Francisco, CA (US)

(72) Inventors: Siya Yang, San Francisco, CA (US); Alan Rogers, San Francisco, CA (US); Daniel Wagner, San Francisco, CA (US); Irene Ma, San Francisco, CA (US); Jason Stakelon, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 4 days.

(21) Appl. No.: 17/364,375

(22) Filed: Jun. 30, 2021

(65) Prior Publication Data

US 2023/0007064 A1 Jan. 5, 2023

(51) Int. Cl.
| | |
|---|---|
| *H04L 65/401* | (2022.01) |
| *G06F 3/04845* | (2022.01) |
| *G06F 3/04812* | (2022.01) |

(52) U.S. Cl.
CPC ...... *H04L 65/4015* (2013.01); *G06F 3/04812* (2013.01); *G06F 3/04845* (2013.01)

(58) Field of Classification Search
CPC . H04L 65/4015; H04L 65/611; H04L 65/403; G06F 3/04812; G06F 3/04845;
(Continued)

(56) References Cited

U.S. PATENT DOCUMENTS

| | | | |
|---|---|---|---|
| 5,838,914 A | * | 11/1998 | Carleton ............. H04L 12/1827 348/E7.083 |
| 8,140,973 B2 | | 3/2012 | Sandquist et al. |

(Continued)

FOREIGN PATENT DOCUMENTS

| | | |
|---|---|---|
| EP | 3837684 A1 | 6/2021 |
| WO | 9946702 A1 | 9/1999 |

OTHER PUBLICATIONS

Notice of Allowance from U.S. Appl. No. 17/364,501, dated Jun. 2, 2022, 2 pages.
(Continued)

*Primary Examiner* — Daniel W Parcher
(74) *Attorney, Agent, or Firm* — Polsinelli PC

(57) ABSTRACT

Techniques are disclosed for allowing remote participation in collaborative video review based on joint state data, for a video collaboration session, maintained by a video collaboration service. A user at a participant client device may provide one or more annotations, such as a drawing annotation, for the video data via a client application. The client application transmits computer-readable instructions for re-creating the drawing annotation to the service, which distributes the drawing instructions to the other participant client devices. Using the drawing instructions, the client applications at the client devices are configured to re-create the drawing annotation on the associated video frame displayed at the client devices. The joint state data communicated to client devices for a given session may include co-presence data that efficiently increases communication among the participants in a session. Co-presence data received by a participant client device may be depicted in a GUI of the client application.

20 Claims, 11 Drawing Sheets

(58) Field of Classification Search
CPC .. G06F 3/04883; H04N 7/15; H04N 21/4788; H04N 21/854

See application file for complete search history.

(56) References Cited

U.S. PATENT DOCUMENTS

| | | | | |
|---|---|---|---|---|
| 8,494,223 | B2 | 7/2013 | Connell et al. | |
| 9,118,886 | B2 | 8/2015 | Wang et al. | |
| 9,307,293 | B2 | 4/2016 | Roberts et al. | |
| 9,686,497 | B1 | 6/2017 | Terry | |
| 9,690,768 | B2 | 6/2017 | Badoiu et al. | |
| 10,079,039 | B2* | 9/2018 | Latulipe | G11B 27/002 |
| 10,747,948 | B1 | 8/2020 | Petrov | |
| 10,755,748 | B2 | 8/2020 | Madduluri | |
| 10,923,139 | B2 | 2/2021 | Shen et al. | |
| 11,238,290 | B2 | 2/2022 | Burns et al. | |
| 11,265,181 | B1* | 3/2022 | Springer | H04N 21/2743 |
| 2007/0160972 | A1* | 7/2007 | Clark | G09B 5/14 434/362 |
| 2009/0292999 | A1* | 11/2009 | LaBine | G06F 3/1454 715/740 |
| 2010/0199191 | A1* | 8/2010 | Takahashi | G06F 3/0481 715/741 |
| 2011/0252339 | A1* | 10/2011 | Lemonik | H04L 67/01 715/753 |
| 2012/0054619 | A1* | 3/2012 | Spooner | G11B 27/034 715/723 |
| 2014/0023341 | A1 | 1/2014 | Wang et al. | |
| 2014/0026076 | A1 | 1/2014 | Jacob et al. | |
| 2014/0047022 | A1* | 2/2014 | Chan | G06Q 10/101 709/204 |
| 2016/0247535 | A1 | 8/2016 | Latulipe et al. | |
| 2016/0259522 | A1* | 9/2016 | Gonzalez | H04L 65/403 |
| 2017/0249970 | A1* | 8/2017 | Loganathan | G11B 27/327 |
| 2017/0257413 | A1 | 9/2017 | Markan et al. | |
| 2020/0269140 | A1 | 8/2020 | Peterke | |
| 2020/0413006 | A1 | 12/2020 | Cheng | |
| 2021/0243482 | A1 | 8/2021 | Baril et al. | |
| 2022/0164408 | A1* | 5/2022 | Petty | G06F 16/958 |

OTHER PUBLICATIONS

Jordan L., "Cospective CineSync: Media Review, Annotation and Collaboration in Real-time," retrieved from: https://larryjordan.com/articles/cospective-cinesync-media-review-annotation-and-collaboration-in-real-time/, posted on Sep. 26, 2019, 5 pages.

McMahon C., "Introducing ftrack Studio 4.6—Efficiency, Easier Reviews, and Customization," retrieved from: https://www.ftrack.com/en/2020/11/introducing-ftrack-studio-4-6.html, Nov. 17, 2020, 36 pages.

"ReviewStudio Review—The Good and Bad for 2021," retrieved from: https://www.crazyegg.com/blog/reviewstudio-review/, updated on Jun. 22, 2021, 14 pages.

Chen Y., et al., "Distributed Rendering: Interaction Delay Reduction in Remote Rendering with Client-End GPU Accelerated Scene Warping Technique", 2017 IEEE International Conference on Multimedia & Expo Workshops, Jul. 10, 2017, IEEE Publishing, 6 pages.

Faga Jr. R., et al., "A Social Approach to Authoring Media Annotations," Document Engineering, Sep. 21, 2010, pp. 17-26.

International Search Report and Written Opinion for Application No. PCT/US2022/016045, dated May 17, 2022, 13 pages.

International Search Report and Written Opinion for Application No. PCT/US2022/016047, dated May 23, 2022, 14 pages.

Li J., et al., "iScreen: A Merged Screen of Local System with Remote Applications in a Mobile Cloud Environment", 2013 IEEE Seventh International Symposium on Service-Oriented System Engineering, Mar. 25, 2013, IEEE Publishing, 9 pages.

Morisse K., et al., "An Approach for Collaboration and Annotation in Video Post-Production", May 22, 2005, Advances in Biometrics: International Conference, ICB 2007, Seoul, Korea, Aug. 27-29, 2007; Proceedings; [Lecture Notes in Computer Science; Lect. Notes Computer], Springer, Berlin, Heidelberg, XP047456827, pp. 375-382.

Notice of Allowance from U.S. Appl. No. 17/364,501, dated May 16, 2022, 8 pages.

Chen J. et al., "Sketch Based Video Annotation and Organization System in Distributed Teaching Environment," International Journal of Distributed Systems and Technologies, available online at: https:www.engineeringvillage.com/.

Cornea R., et al., "Annotation Based Multimedia Streaming Over Wireless Networks," IEEE/ACM/IFIP Workshop on Embedded Systems for Real Time Multimedia, Oct. 2006, pp. 47-52.

Non-Final Office Action from U.S. Appl. No. 17/885,109, dated Aug. 22, 2023, 8 pages.

Styles O., et al., "Multiple Object Forecasting: Predicting Future Object Locations in Diverse Environments," Computer Vision and Pattern Recognition (CVPR), May 2020, pp. 690-699.

Usman M.A., et al., "A Novel No-Reference Metric for Estimating the Impact of Frame Freezing Artifacts on Perceptual Quality of Streamed Videos", IEEE Transactions on Multimedia, Feb. 2018, vol. 20, No. 9, pp. 2344-2359.

* cited by examiner

602 CONCURRENTLY STREAM VIDEO DATA TO A PLURALITY OF CLIENT DEVICES BASED, AT LEAST IN PART, ON JOINT STATE DATA THAT COMPRISES A CURRENT FRAME VALUE IDENTIFYING A CURRENTLY-VIEWED FRAME OF A PLURALITY OF VIDEO FRAMES OF THE VIDEO DATA

604 RECEIVE, FROM A PARTICULAR CLIENT DEVICE OF THE PLURALITY OF CLIENT DEVICES, A PLURALITY OF REAL-TIME DRAWING DATA UPDATES FOR A DRAWING ANNOTATION PERFORMED ON A PARTICULAR FRAME OF THE PLURALITY OF VIDEO FRAMES AT THE PARTICULAR CLIENT DEVICE, THE PLURALITY OF REAL-TIME DRAWING DATA UPDATES BEING RECEIVED IN REAL TIME OVER A PARTICULAR TIMESPAN

606 DURING THE PARTICULAR TIMESPAN, TRANSMIT, TO EACH CLIENT DEVICE OF THE PLURALITY OF CLIENT DEVICES OTHER THAN THE PARTICULAR CLIENT DEVICE, EACH REAL-TIME DRAWING DATA UPDATE OF THE PLURALITY OF REAL-TIME DRAWING DATA UPDATES, SAID EACH CLIENT DEVICE BEING CONFIGURED TO DISPLAY, DURING THE PARTICULAR TIMESPAN AND BASED ON EACH REAL-TIME DRAWING DATA UPDATE OF THE PLURALITY OF REAL-TIME DRAWING DATA UPDATES, AN UPDATED VERSION OF THE DRAWING ANNOTATION ON THE PARTICULAR FRAME DISPLAYED AT SAID EACH CLIENT DEVICE

608 DETECT A FREEZE CONDITION BASED ON THE PLURALITY OF REAL-TIME DRAWING UPDATES

610 BASED ON THE DETECTED FREEZE CONDITION, FREEZE THE CURRENT FRAME VALUE, IN THE JOINT STATE DATA, AT THE PARTICULAR FRAME

FIG. 6

TECHNIQUES FOR EFFICIENT COMMUNICATION DURING A VIDEO COLLABORATION SESSION

RELATED APPLICATION

This application is related to U.S. application Ser. No. 17/364,501 titled "Techniques for Avoiding Conflicting User Actions During a Video Collaboration Session", and filed Jun. 30, 2021, the entire contents of which is hereby incorporated by reference as if fully set forth herein.

TECHNICAL FIELD

This disclosure relates to collaborative viewing of streaming video data, and more specifically, to a video collaboration service facilitating communication among client devices participating in a video collaboration session via client interfaces displayed at the client devices.

BACKGROUND

Video production generally requires multiple collaborators for any given video project, including, e.g., directors, producers, cast, crew, lighting specialists, artists, computer animators, etc. It can be very helpful for multiple collaborators to collectively view and comment on the same video at the same time.

One way to accomplish collaborative video review is to gather all of the collaborators together in the same location to view and discuss the video in-person. However, given the current global nature of video production, not all teams are comprised of members that have easy access to the same geographical location. Furthermore, it can be challenging to record the particulars of such an in-person meeting for future review, including all comment information from the collaborators and the portions of the video to which the comments pertain.

Another way to accomplish collaborative video review, which does not require the collaborators to be in the same location, is via networked computing systems that provide video collaboration services. Such video collaboration services allow users to collectively view video data and comment on the video data using client interfaces running on individual client devices. Some video collaboration services allow users to share video data based on screen sharing, where one of the collaborators plays the video on their client device and shares the screen with the other collaborators via the video collaboration service. Other video collaboration services stream the video data to the various client devices that are part of the collaboration.

There are different ways that video collaboration services allow collaborators to share information about the subject video data. For example, some video collaboration services allow collaborating client devices to share a communication stream, which may be recorded, and may also allow collaborators to record comments on video data.

Because sharing video/audio data requires significant network bandwidth, it can be challenging to communicate additional data among collaborating client devices without negatively impacting the quality of the shared video/audio data. For example, image data for drawing annotations generated for video data can be large and costly to transmit. Systems and methods disclosed herein address this and other issues.

The approaches described in the above section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

BRIEF DESCRIPTION OF THE DRAWINGS

In the drawings:

FIG. 6 depicts a flowchart for detecting and enforcing a freeze condition for a current video timestamp in joint state data maintained for a video collaboration session.

DETAILED DESCRIPTION

Figure 1:
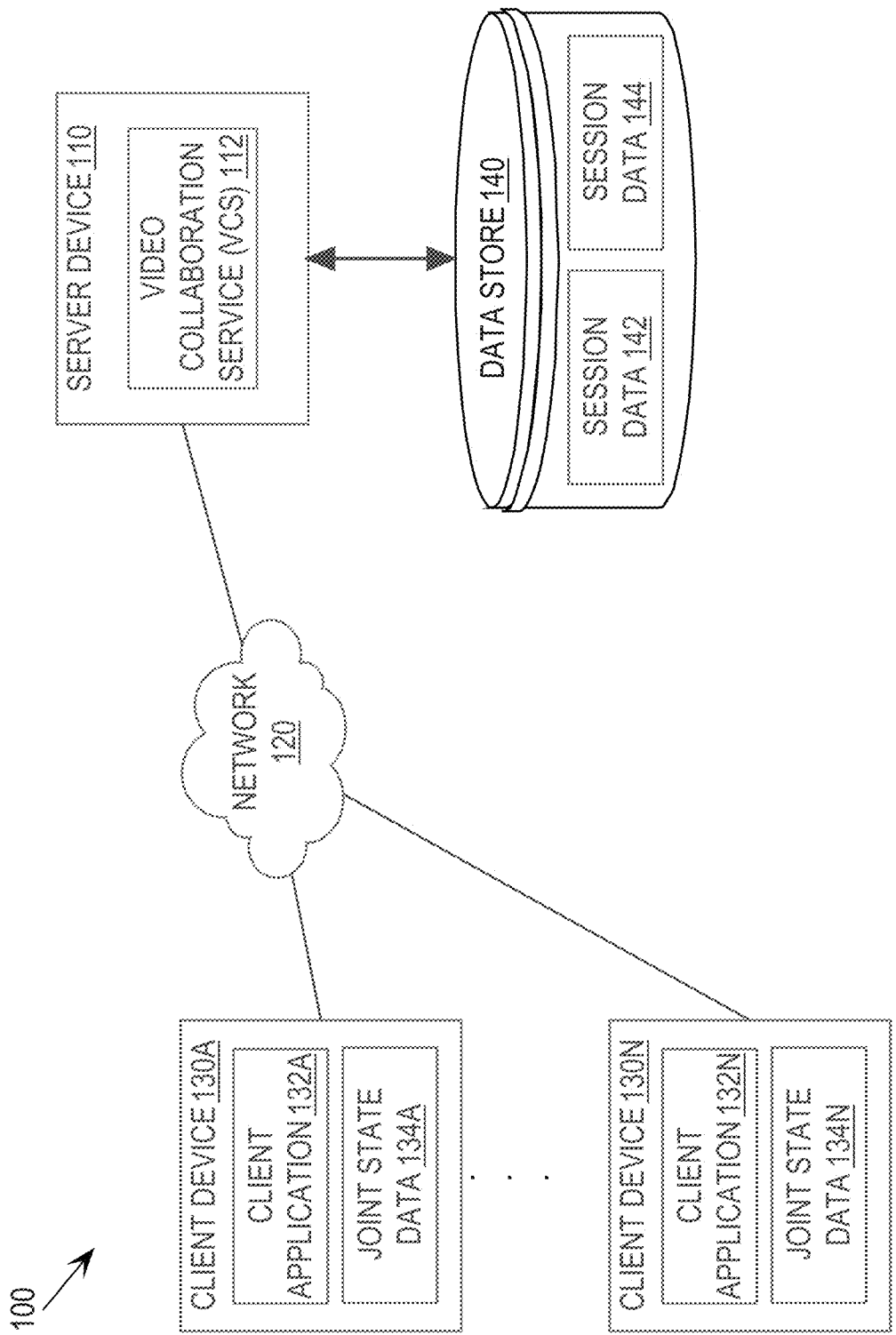
FIG. 1 depicts an example network arrangement for efficient communication among client devices during a video collaboration session.

In the following description, for the purposes of explanation, numerous specific details are set forth in order to provide a thorough understanding of the techniques described herein. It will be apparent, however, that the techniques described herein may be practiced without these specific details. In other instances, well-known structures and devices are shown in block diagram form in order to avoid unnecessarily obscuring the described techniques.

1. General Overview

Techniques are disclosed for allowing users at different client devices to participate in collaborative video review based on joint state data, for a video collaboration session, maintained by a video collaboration service. Specifically, the video collaboration service maintains joint state data for a video collaboration session, and provides at least a portion of the joint state data to each client device that participates in the session. The video collaboration service facilitates efficient communication among client devices participating in a video collaboration session by sending incremental updates of the joint state data for the session to the client devices.

The joint state data for a video collaboration session may identify video data for the session, a current frame number or current video timestamp identifying a synchronously-viewed (or current) frame for video data being jointly viewed for the session, and one or more types of annotation provided by client devices participating in the session, including information for one or more of: general text comments, frame-specific text comments, frame-specific drawing annotations, and multi-frame drawing annotations.

Annotations on video data for a session created by users that are participating in the session may be provided to the video collaboration service via client applications running at the participant client devices. Specifically, a client application running at a client device causes video data to be displayed at a display device, and a user at the client device may provide one or more annotations for the video data via the client application. For example, a user uses drawing tools of a client application at a particular client device to create a drawing annotation on a current frame displayed by the client application. The client application transmits computer-readable instructions for re-creating the drawing annotation to the video collaboration service, which distributes the drawing instructions to the other client devices participating in the video collaboration session. According to some embodiments, the client devices store drawing instructions to local versions of the joint state data. Using the drawing instructions, the client applications at the client devices are configured to re-create the drawing annotation on the associated video frame displayed at the client devices.

The joint state data communicated to client devices for a given session may further include co-presence data that increases the efficiency of communication among the participants in a session thereby reducing the cognitive burden on the participants and improving the human-computer interface for collaborative video review systems. Some or all of this co-presence data may also be persisted to the session data recorded for the session. Co-presence data may include one or more of: cursor positions for participant client devices, identification of "invisible" actions performed at participant client devices (such as mouse-overs of graphical user interface (GUI) controls), information regarding actions that affect the joint state of the session (such as activation of video playback controls), etc. Co-presence data received by a participant client device may be depicted in a GUI of the client application in many ways, including as displayed text, as an icon associated with a GUI control, as a visual indication associated with a GUI control, as a user identifier displayed in connection with a GUI control, as a user identifier displayed in connection with a video frame, etc.

Information from the joint state data maintained for a given video collaboration session, including some or all of the participant annotations (including drawing instructions) received during the session may be persisted to session data that includes information from the joint state data for the session. The persisted session data may be used to efficiently display the participant annotations with the video data after the session is complete, e.g., during a review of the session. Session data may also include events timeline data for the session, with stored participant annotations being associated with timestamps of the events timeline data.

The participant annotations stored in session data may be reviewed, in connection with the associated video data, with or without respect to a stored events timeline. During review, drawing instructions included in the session data are used to re-create (re-play) drawing annotations created during the session.

The timing of drawing instruction execution can be implemented in various ways. According to some embodiments, all of drawing instructions associated, in the session data, with a given video frame are automatically executed upon loading the video frame. According to some embodiments, drawing instructions associated with a given video frame are executed in an order in which the instructions were originally received during the session as indicated by the events timeline data stored in the session data. For example, during a session review, each instruction is performed, in order, with a fixed amount of delay time between performing each instruction. According to another embodiment, drawing instructions associated with a given video frame are executed at relative times indicated by the events timeline data stored in the session data. Thus, the timing of drawing annotations performed during the session review mirrors the timing of drawing annotations performed during the original session. This embodiment facilitates review of the session data in connection with video or audio data generated during the session.

Furthermore, additional drawing annotations on video data associated with a completed session may be generated outside of the session. Such additional drawing annotations may be displayed with the session drawing annotations without requiring any additional processing of the session data. For example, drawing instructions for additional drawing annotations may be added to the persisted session data, or may be stored in auxiliary session data that may be either (a) combined with the original session data upon review of the session, or (b) reviewed separately from the original session data. If drawing instructions for additional drawings are included in stored session data for a previous session, the additional drawings may be visually tagged as out-of-session drawings.

Because client devices store participant annotations in local joint state data stores, the client devices are able to display received participant annotations without using network bandwidth (other than receiving the initial joint state data updates, from the video collaboration service, indicating participant annotations not originating from the client device). Furthermore, because the drawing annotations are re-created (as needed) based on lightweight drawing instructions, rather than using bulky image data, communication of drawing annotations among participant client devices is relatively inexpensive. Also, the drawing instructions may be persisted for future display using much less storage space than would be required to store image data depicting drawing annotations. Further, adding drawing annotations after completion of a session is inexpensive because, like the drawing annotations created during the session, the additional drawing annotations are re-created from drawing instructions that are very inexpensive to store and to transmit across the network.

2. Example Client Application

FIG. 1 depicts an example network arrangement 100 for efficient communication among client devices during a video collaboration session. According to some embodiments, a video collaboration service (VCS) 112 running on an example server device 110 of network arrangement 100 receives a request to set up a video collaboration session based on one or more videos, i.e., the video data for the session. In response to the request, VCS 112 establishes a video collaboration session based on joint state data that identifies the video data for the session. Users may join the established session via client applications 132A-N on client devices 130A-N. (For ease of explanation, when the general functionality of a client device is being discussed, an individual client device is referred to as client device 130, an individual client application is referred to as client application 132, and an individual local joint state data store (described in further detail below) is referred to as joint state data 134.) According to some embodiments, client application 132 is a stand-alone application executing on client device 130. According to another embodiment, client application 132 runs via a browser at the client device 130.

According to some embodiments, client application 132 is implemented by a client object that wraps a websocket connection and keeps track of joint state data 134. For playback, client application 132 keeps a local copy joint state data 134, which is initialized as undefined. When a client application 132 joins a particular session, the client application receives a video playback message from VCS 112 and updates the local copy of joint state data 134, as described in further detail below.

Figure 2:
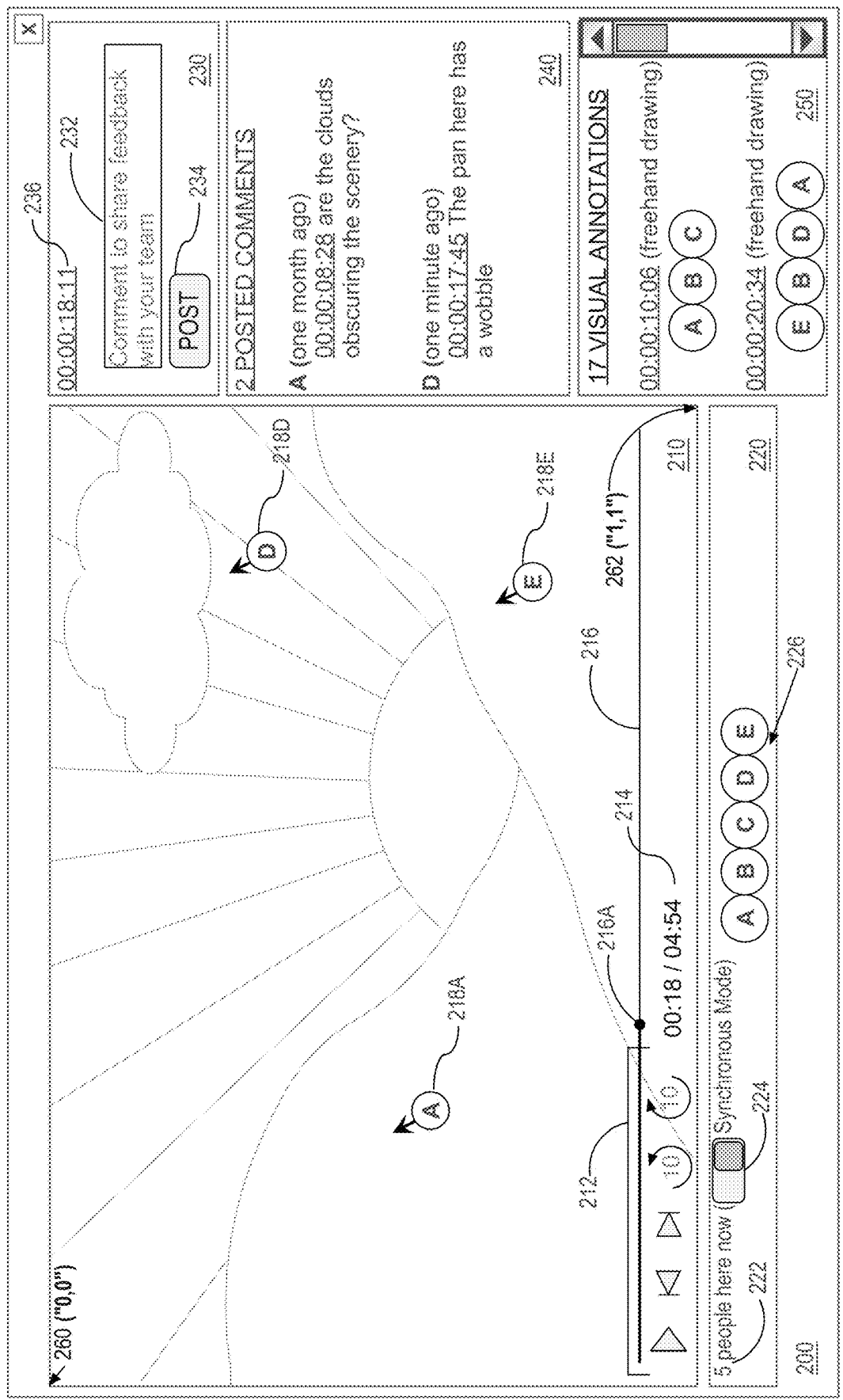
FIG. 2 depicts an example graphical user interface for a client application of a video collaboration service.

FIG. 2 depicts an example GUI 200, for client application 132, displayed at a display device for client device 130. GUI 200 is used to illustrate embodiments described herein, but embodiments are not limited thereto. Example GUI 200 includes a video viewing area 210, a participant area 220, a commenting area 230, a posted comments area 240, and a visual annotations area 250.

2.1. Video Viewing Area

According to some embodiments, VCS 112 causes video data for the session to be streamed, via network 120, to each of participating client devices 130A-E. Each client device 130 displays the video via client application 132. For example, video viewing area 210 displays the video data being streamed in connection with the video collaboration session. Video viewing area 210 further includes video playback controls 212, which comprise a play/pause control, a rewind-single-frame control, a fast-forward-single-frame control, a rewind 10 seconds control, and a fast-forward 10 seconds control. Video viewing area 210 also includes a progress timestamp 214 that displays the current timestamp of the viewed video data, and also the length of the video data. Video viewing area 210 further includes a progress bar 216 with a current timestamp control 216A, which may be moved (e.g., by clicking on and dragging control 216A) along progress bar 216 to cause the timestamp of the displayed portion of the current video data to correspond to the position of current timestamp control 216A along progress bar 216.

2.2. Participant Area

Participant area 220 of GUI 200 includes an indication 222 of how many client devices are participating in the video collaboration session (e.g., five client devices 130A-E). Participant area 220 further includes a toggle control 224 that controls whether client application 132 is in synchronous mode (as described in further detail below). To illustrate, when toggle control 224 is toggled to the "on" position, client application 132 is in synchronous mode, and when toggle control 224 is toggled to the "off" position, client application 132 is in asynchronous mode.

Participant area 220 further includes user identifier tokens 226 that identify the users participating in the video collaboration session, e.g., via client devices 130A-E. User identifier tokens 226 may include a user identifier or may show pictures or icons associated with the identified users. In the example of FIG. 2, users A-E have authenticated with VCS 112 via client applications 132A-E on client devices 130A-E, and are identified by tokens 226 as participating in the video collaboration session. A user may participate in a video collaboration session as an unauthenticated guest, in which case a token 226 representing the unauthenticated user does not reflect a user identifier.

2.3. Commenting Area

Commenting area 230 comprises a comment input text box 232 into which a user may type a comment annotation on the video data. Commenting area 230 further comprises a post control 234 that, when activated, causes any text in comment input text box 232, with a current timestamp of the video being displayed in area 210 and an identifier of the user (if available), to be saved to local joint state data 134 and to be sent to VCS 112 as an annotation on the video data. VCS 112 includes the posted comment annotation in joint state data maintained by VCS 112, and causes local versions of joint state data 134 to be updated to reflect the posted comment annotation.

2.4. Posted Comments Area and Visual Annotations Area

Posted comments area 240 displays comment annotations that are included in joint state data 134 with the video timestamps associated with the comment annotations. Similarly, visual annotations area 250 displays visual annotations for which instructions are included in joint state data 134 with the video timestamps associated with the visual annotations. Annotations may further be represented with user identifiers and/or an indication of the type of annotation (such as "text", "freehand drawing", "sticker", "shape", "emoji", etc.). According to some embodiments, the type of annotation or other information included in posted comments area 240 and/or visual annotations area 250 for a particular annotation may be based on metadata for the annotation provided by a user (e.g., a title, a type, or a portion of comment text, etc.).

Thus, when VCS 112 causes joint state data 134 to be updated with additional comment annotations and drawing annotations from other participant devices, these annotations are automatically reflected in posted comments area 240 and visual annotations area 250. According to some embodiments, posted comments area 240 and visual annotations area 250 continue to be updated based on joint state data 134 while client application 132 is in either of synchronous mode or asynchronous mode. According to some embodiments, representations of annotations included in posted comments area 240 and visual annotations area 250 are video playback controls, activation of which jumps video playback to the timestamp associated with the activated annotation representation.

According to some embodiments, annotation representations displayed in posted comments area 240 and visual annotations area 250 are hyperlinked such that clicking on (or otherwise activating a control associated with) an annotation representation causes VCS 112 to receive a video playback instruction to move playback to the video frame associated with the annotation representation. According to some embodiments, the video playback instruction further causes playback to automatically pause on the annotated frame. Furthermore, progress bar 216 may be associated with visual identifiers of annotated frames. Each of these visual identifiers may comprise a control, activation of which causes VCS 112 to receive a similar video playback instruction to skip to the associated annotated frame and pause playback.

3. Disseminating Annotations and Co-Presence Data

Figure 3:
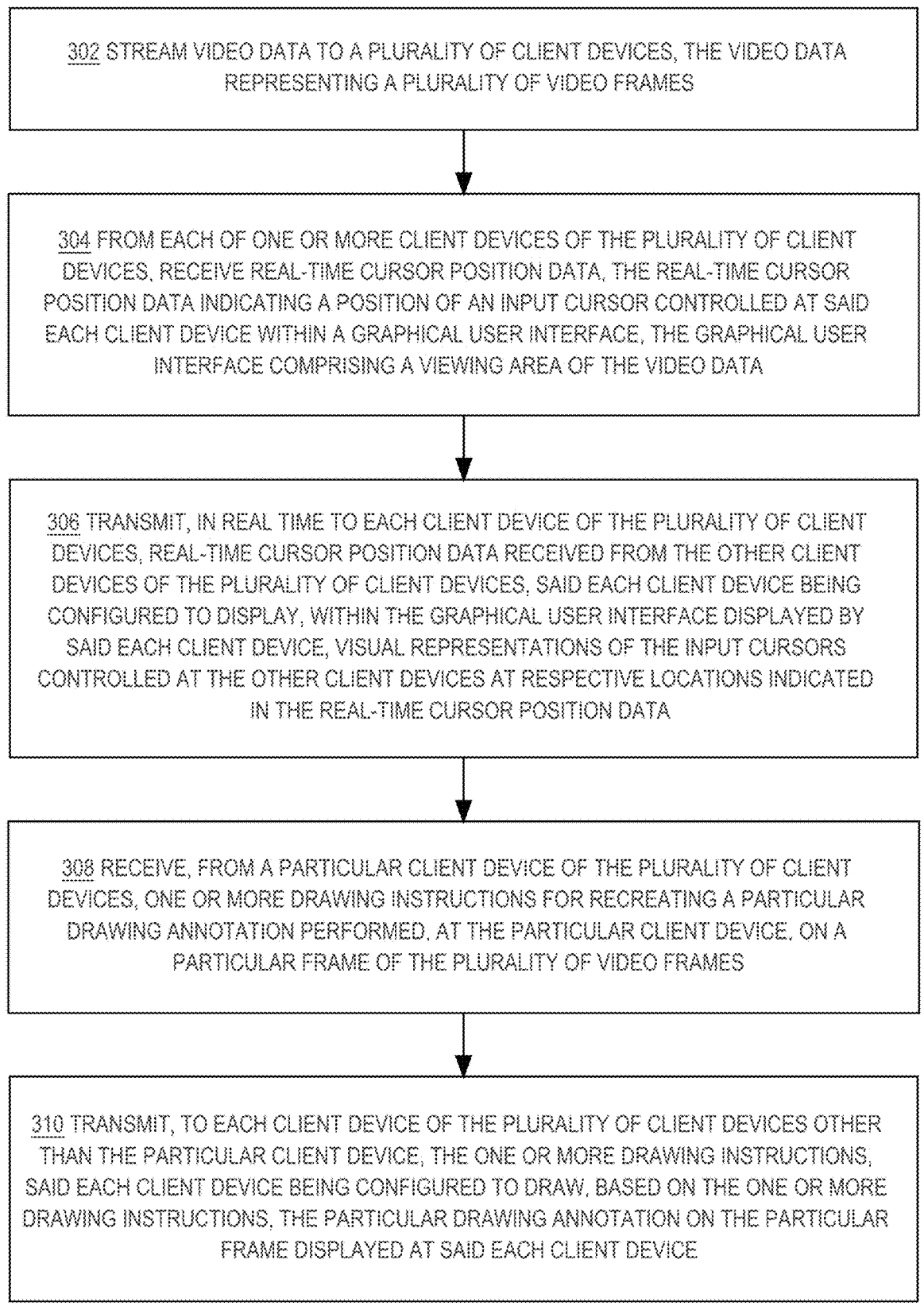
FIG. 3 depicts a flowchart for disseminating information for drawing annotations to video collaboration session participants.

As indicated above, VCS 112 allows video collaboration session participants to create drawing annotations for the video data of the session, e.g., displayed in viewing area 210, and to share the drawing annotation with the other participants of the session. A drawing annotation may be displayed to the other session participants in real time, which allows the other participants to view the drawing as it is being created, or may be transmitted based on an explicit instruction from a user. FIG. 3 depicts a flowchart 300 for disseminating information for drawing annotations to client applications for video collaboration session participants, according to embodiments described herein.

3.1. Creating and Joining a Video Collaboration Session

Specifically, at step 302, video data is streamed to a plurality of client devices, the video data representing a plurality of video frames. For example, VCS 112 establishes a particular video collaboration session by initializing joint state data for the session with an identifier of particular video data and, e.g., a current video timestamp of 00:00:00. Client applications 132A-E of client devices 130A-E join the particular session by downloading the joint state data for the session from VCS 112. After client applications 132A-E join the session, VCS 112 causes the particular video data for the session to be streamed, via network 120, to each of participating client devices 130A-E. Each client device 130 displays the video via client application 132, e.g., in viewing area 210 of GUI 200.

For example, VCS 112 receives a request to create a video collaboration session for the particular video data. In response to receiving the request, VCS 112 creates a new session, as described above, and provides a Uniform Resource Locator (URL) that is associated with the new session as a response to the request. Activation of the URL retrieves a webpage from VCS 112 via network 120. Loading the webpage into a browser application running on client device 130 causes execution of client application 132, which downloads the joint state data 134 for the session associated with the URL and causes display of GUI 200 as a user interface to client application 132. In this example, the provided URL is activated at each of client devices 130A-E to retrieve and load the webpage into a browser application running at each client device. Thus, each of client devices 130A-E stores a local version of the joint state data 134A-E for the established session.

According to some embodiments, joint state data 134 and/or session data (e.g., session data 142, 144 described in detail below) are managed by a content management system. In such embodiments, the content management system facilitates communication of joint state data 134 among client devices 130, as described in further detail below. VCS 112 may be implemented as part of the content management system, or may interface with the content management system for purposes of managing joint state data 134 and/or session data.

3.2. Video Playback Messages

Video playback messages are used to synchronize video playback among client applications that are part of a given session. For example, a message comprising a video playback instruction includes a current frame (e.g., the frame of the video data at which the playback instruction was initiated), and a playback rate (e.g., a positive rate for forward movement and a negative rate for backward movement, such as 1.0 for playing at normal speed, 10.0 for fast forward, 0.0 for paused, and −10.0 for rewind). According to some embodiments, such a message further includes a timestamp, which represents a current date/time recorded at the source client device that marks a time at which the action was initiated. Such a timestamp may be used to allow receiving client applications 132 to 'skip ahead' to account for how long it takes for the message to go be communicated among client devices.

Client application 132 sends a video playback message to VCS 112 whenever the play state locally changes at the client application, e.g., while the client application is in synchronous mode, as described in further detail below. Specifically, when a user takes an action that triggers a video playback event, such as play, pause, seek, rate change, etc., client application 132 calculates the current frame and playback rate, and updates the local joint state data 134. According to some embodiments, if the current frame and playback rate values have changed, or if the video has been playing for longer than a single frame duration (in case the instruction is to seek back to the starting position after the video has played), then client application 132 sends a video playback message to VCS 112 reflecting the video playback instruction.

Upon receipt of such a video playback message from a client application 132, VCS 112 sends corresponding video playback messages to all other client applications 132. According to some embodiments, VCS 112 also echoes back a video playback message to the client application 132 that originally sent the message.

According to some embodiments, when sending a video playback message for an action locally taken at a client application, the client application keeps a count of pending changes that have been sent. According to some embodiments, when receiving a video playback message from VCS 112 that originated at another client application, client application 132 ignores received video playback messages when the local count of pending changes is >0. However, if the video playback message originated from the local client application (i.e., an echo), client application 132 decrements the pending changes count. If the pending changes count is already zero, then client application 132 updates joint state data 134 and initiates the onPlayback protocol. It is safe to ignore remote video playback messages after a client application has originated one or more video playback messages, as VCS 112 is guaranteed to send out messages in the order the message are received. Thus, if a client application 132 receives any remotely-originated messages before a locally-originated message is echoed back, the received remotely-originated messages are old and out of date.

Further, a video playback message may be sent by VCS 112 to a client application 132 when the client application has newly joined a session, i.e., to inform the newly-joined client application of the current video playback action for the session. To facilitate these initial video playback instructions, video playback instructions received from client applications 132 may be persisted, e.g., to session data 142, which acts as a data store from which VCS 112 may retrieve initial video playback instructions, as needed.

According to some embodiments, when client application 132 receives an initial video playback message, client application 132 updates joint state data 134 to reflect the information in the initial message and initiates an onPlayback protocol described in further detail below.

3.3. OnPlayback Protocol

Client application 132 implements an onPlayback protocol by which client application 132 that updates a remotePlaybackState shared state variable in joint state data 134. Client application 132 uses this state to control playback of the video data. Thus, whenever client application 132 sees the remotePlaybackState change, client application 132 performs the following:

Disables any player event handlers (so that remote changes do not trigger another broadcast).
Calculates the correct player time using the frame number and frame rate of the video.
If the new state indicates a playing mode for the video data, client application 132 sets the currentTime of the local player, and then plays the video.
If the new state indicates a paused mode for the video data, client application 132 pauses the local player and then sets the currentTime.

Client application 132 then reenables the player event handlers.

3.4. Synchronous Mode and Asynchronous Mode

According to some embodiments, client application 132 may be in synchronous mode or asynchronous mode, e.g., based on user preferences or based on a mode assigned by the session master. When client application 132 is in synchronous mode, the application controls video playback synchronously with the session data, i.e., based on joint state data 134, which synchronizes video playback for the client applications in the video collaboration session operating in synchronous mode. When client application 132 is in asynchronous mode, the application controls video playback based on activation of the controls in GUI 200 without respect to joint state data 134, which allows control of the video playback independent of the video collaboration session.

Thus, in general, when client application 132 is in synchronous mode, activation of video playback controls, such as playback controls 212 and current timestamp control 216A, causes client application 132 to send video playback instructions to VCS 112, which (in general) causes local joint state data 134 stored at all participant client devices to be updated based on the video playback instructions. Video playback instructions are instructions that affect playback of the video data, such as instructions resulting from activation of controls 212 including play, rewind, fast forward, pause, and skip to a particular video timestamp. There are some instances (such as when there is an active freeze condition described in further detail below, or when a client application 132 does not have permission to control joint video playback) where activation of playback controls when in synchronous mode does not cause VCS 112 to update the joint state data. When client application 132 is in synchronous mode, the application performs playback of the streaming video data in viewing area 210 based on joint state data 134, e.g., client application 132 causes the streamed video to be displayed at the current video timestamp indicated in joint state data 134. Thus, all participant client devices operating in synchronous mode view the same portions of the video data at the same time, even while the video data is being individually streamed to the participant client devices 130A-E.

According to some embodiments, multiple different video files are associated with a session, and the joint state data maintained for the session identifies all of the different video files. In this embodiment, the joint state data further identifies a particular one of the different video files as the current video file for the session. A client application that is in synchronous view mode displays the video identified as the current video file for the session.

In asynchronous mode, client application 132 does not control video playback based on joint state data 134, but instead controls video playback based on activation of the controls in GUI 200 of the client application. According to some embodiments, any annotations created while client application 132 is in asynchronous mode are transmitted to VCS 112 according to embodiments described in further detail below. However, drawing annotations created while client application 132 is in asynchronous mode are not displayed in real-time at the other participant client devices (as described in further detail below). Furthermore, in asynchronous mode, client application 132 continues to update joint state data 134 based on actions performed at participating client devices that are communicated to VCS 112. According to some embodiments, GUI 200 includes a control that allows a user to switch between synchronous mode and asynchronous mode. When a user activates a control to enter synchronous mode, video playback at the client device of the user is controlled by the joint state, as described herein. When a user activates a control to enter asynchronous mode, client application 132 continues with any current video playback actions from the synchronous state (e.g., play, pause, rewind, fast forward, etc.). However, while a client application 132 is in asynchronous mode, any video playback instructions generated at that client affects only video playback for the client, as described herein.

According to some embodiments, VCS 112 records, in the joint state data for the session, playback instructions received from client applications that are in synchronous mode. These recorded playback instructions may be associated with timestamps of an events timeline, which facilitates review of the session data, as described in further detail below.

3.5. Input Cursor Co-Presence

According to some embodiments, VCS 112 displays, via GUI 200 at participant client devices 130A-E, location indicators of input cursors controlled at the other participant client devices that are found within an active co-presence area of GUI 200, which includes one or more of areas 210-250. According to some embodiments, the active area of GUI 200 includes at least area 210.

According to some embodiments, in addition to displaying a location indicator of an input cursor controlled by a particular client device, VCS 112 also causes client applications 132 to display one or more auxiliary location indicators for one or more additional location-based activities being performed at the particular client device. For example, in addition to an input cursor, a user at a particular client device 130 provides information for an auxiliary location input, such as a stylus location or touch screen activation location, within the active area of GUI 200. In this example, VCS 112 causes the other client devices 130 to display both a first location indicator of the input cursor of the particular client device 130, and also a second location indicator of the auxiliary location input from the particular client device 130. The second location indicator may have one or more common visual elements to indicate that the first and second location indicators originate from the same client device. Any number of location indicators may originate from a particular client device 130. In such embodiments, cursor data further includes data for the one or more auxiliary location inputs.

Returning to the discussion of flowchart 300, at step 304, from each of one or more client devices of the plurality of client devices, real-time cursor data is received, the real-time cursor data indicating a position of an input cursor controlled at said each client device within a graphical user interface, the graphical user interface comprising a viewing area of the video data. For example, VCS 112 receives, in real time from one or more of client devices 130A-E, cursor data that indicates a position, within the active area of GUI 200, of an input cursor controlled at each client device. According to some embodiments, cursor data further comprises one or more of pressure, velocity, angle, tool type, etc., which may be used to adjust the depiction of the cursor. Further, such cursor metadata may be used to inform a visual representation of an action being performed via the cursor, such as a drawing annotation being created. For example, the pressure associated with a cursor of a user creating a freehand drawing is used to select a line weight for the drawing, where light pressure generates a thin line and heavier pressure generates a thicker line.

According to some embodiments, cursor data comprises X-Y coordinates indicating the position of the cursor within the active area. For example, when multiple areas of GUI 200 are included in the active area, a particular cursor position datum includes an area identifier, and X-Y coordinates relative to the indicated area. As another example, when the active area of GUI 200 is amenable to a single system of X-Y coordinates, a particular cursor position datum includes X-Y coordinates without an area identifier. As yet another example, a particular cursor position datum comprises cursor movement data indicating a direction and distance, which can be used to calculate a current position of the cursor based on previously-known positions.

For example, point 260 in area 210 is considered to be at the X-Y coordinate "0, 0", and point 262 in area 210 is considered to be at the X-Y coordinate "1, 1". In this example, the position of an input cursor that is located within area 210 is determined relative to points 260 and 262.

To illustrate, a user A at client device 130A, who has authenticated with client application 132A, moves an input cursor into an active area (e.g., viewing area 210) of GUI 200. Accordingly, client application 132A sends, to VCS 112, cursor data that identifies the current position of the input cursor as "0.26, 0.53", i.e., relative to points 260 and 262 of area 210. Similarly, VCS 112 receives cursor data from client application 132D, which has authenticated a user D, identifying a current cursor position of "0.83, 0.28", and VCS 112 receives further cursor data from client application 132E, which has authenticated a user E, identifying a current cursor position of "0.79, 0.75".

At step 306 of flowchart 300, real-time cursor data received from the other client devices of the plurality of client devices is transmitted, in real time, to each client device of the plurality of client devices, said each client device being configured to display, within the graphical user interface displayed by said each client device, visual representations of the input cursors controlled at the other client devices at respective locations indicated in the real-time cursor data. For example, VCS 112 transmits, in real-time to each client device 130A-E, cursor data not received from the client device along with information identifying a source of each cursor position datum (e.g., a user identifier, a cursor identifier, a client device identifier, etc.). Real-time data is data received within a specified (relatively short) time of creation. According to some embodiments, cursor data is real-time data when the data is received by VCS 112 and disseminated to the other participant client devices within a threshold amount of time, e.g., 100 milliseconds.

Based on the received cursor data, each client device 130 displays representations of input cursors being controlled at the other participant client devices. For example, GUI 200 of FIG. 2 is displayed at client device 130B. Client application 132B receives cursor data from VCS 112 and, according to some embodiments, updates joint state data 134B to reflect the cursor data. Based on the cursor data, client application 132B displays input cursor representations 218A, 218D, and 218E, which are location indicators showing the locations indicated in the received cursor data.

In the example of FIG. 2, representations of input cursors for users B and C (authenticated at client applications 132B and 132C, respectively) are not displayed in GUI 200 at any of the participant client devices 130A-E (other than the device at which the input cursor is controlled), either because the client application 132 is in stealth mode, or because the input cursor is not within the active area of GUI 200.

According to some embodiments, the input cursor controlled by a particular user may not be displayed by other client applications participating in the same session because the client application 132 is in a stealth mode whereby the input cursor is not displayed by the other participants in the video collaboration session even when within the active area of GUI 200. Stealth mode may be selected by the user, e.g., in an options menu of GUI 200, or may be imposed on the user by a master of the session. For example, cursor data may not be sent to VCS 112 by client application 132 while in stealth mode, or coordinate data may be received at VCS 112 from a client application 132 in stealth mode and, based on the application being in stealth mode, VCS 112 does not disseminate the cursor data to the other participant client applications (as described in further detail below).

According to some embodiments, one or more visual aspects of a representation of a cursor displayed in GUI 200 identifies the source of the cursor data. For example, each cursor representation may be displayed with information identifying the source of the cursor, such as an avatar or other picture, a username, user initials, etc. As another example, each cursor may be depicted at least partly with a particular color that is unique among the displayed cursor representations, where the color may be on the whole cursor representation or on part of the cursor, or the color may be associated with data identifying a source of the cursor. For example, the identifying color may be behind text associated with the cursor, may be the color of some or all text associated with the cursor, may outline text associated with the cursor, may outline a picture associated with the cursor, etc. The color may be assigned by a session master, chosen by the user, or may be automatically assigned by VCS 112. According to some embodiments, the user may change their assigned color via a menu in GUI 200, or by middle- or right-clicking within GUI 200, or by using a keyboard input (such as a dedicated function button or a combination of buttons used to change cursor color). According to some embodiments, the user may select a color from the colors not used to identify other participants, or may be automatically assigned a different color that is not already used to identify another participant.

According to some embodiments, the active area of GUI 200 includes areas other than area 210, such as one or both of posted comments area 240 and/or visual annotations area 250. In this example, VCS 112 causes location indicators to be displayed for input cursors and/or other location-based activities within these other areas that are part of the active area for GUI 200. Furthermore, VCS 112 may cause activities performed within one or more areas other than area 210 to be propagated among client devices 130. For example, VCS 112 may cause joint state data 134 to reflect actions within these areas (such as expand/collapse of lists, activation of controls, highlighting of a particular annotation representation, etc.) which is used to perform these actions in GUI 200 displayed at other client devices 130.

3.6. Creating Drawing Annotations

According to some embodiments, VCS 112 allows users to create drawing annotations on frames of the video data being streamed, and includes information for the drawing annotations in joint state data recorded for the session. For example, when the video data is paused on a particular frame, a user may click-and-drag across area 210, which causes a line to be drawn on the displayed frame where the user drags the cursor.

Figure 10:
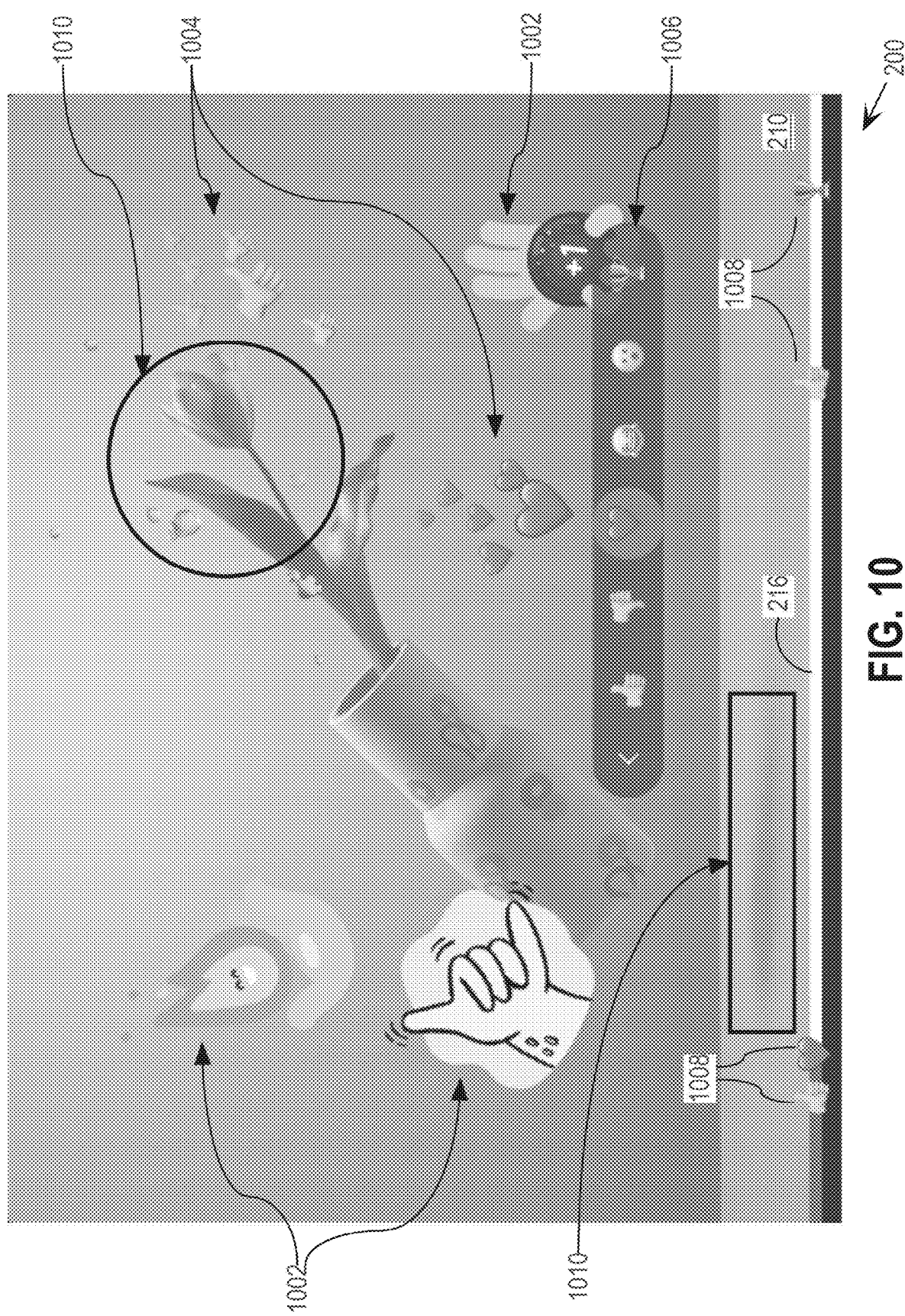
FIG. 10 depicts example visual annotations for video frames.

Other drawing tools may also be available to the user. For example, FIG. 10 depicts GUI 200 with example visual annotations for video frames, according to some embodiments. Specifically, FIG. 10 depicts stickers 1002, emojis 1004, and shapes 1010 that have been applied to a current frame displayed in GUI 200. FIG. 10 further depicts an emoji/sticker/shape control bar 1006 with controls for applying emojis, shapes, and/or stickers to the current frame. Shapes may be any geometric shape, and may be any size, color, or line weight, and may be filled in any way. Emojis, stickers, and/or shapes may be generally associated with a given frame, or may be associated with a particular location on the frame, as described herein for drawing annotations. The example visual annotations herein may be managed (e.g., with respect to communication among client devices, tracking, recording in joint session data 134 and/or session data 142/144, freeze conditions, etc.) as described herein for drawing annotations.

Furthermore, progress bar 216 comprises emoji/sticker/shape indicators 1008 marking timestamps at which emojis, shapes, and/or stickers have been applied to frames of the video data. Indicators 1008 may also mark timestamps of one or more other types of annotations, such as comments and/or drawing annotations. According to some embodiments, the visual depiction of each of indicators 1008 reflects one or more characteristics of the represented annotation. In the example of FIG. 10, each indicator 1008 is an example emoji/sticker/shape applied to the frame. The emoji/sticker/shape used as the visual representation of an indicator 1008 may be selected in any way, e.g., based on the emoji with the highest number of applications to the frame, the emoji/sticker/shape that was first applied to the frame, etc. Distinct visual representation aspects for indicators 1008 may correspond to the different types of annotation data. Furthermore, the visual representation of an indicator may include an identifier of a user that created the represented annotation, or of a set of users that have generated annotations on the frame. According to some embodiments, selection of one of indicators 1008 causes generation of a video control command that causes the video data to jump to the timestamp marked by the selected indicator.

According to some embodiments, a look and feel of a drawing annotation is unique to the user that created the annotation. For example, a color of the drawing may correspond to a color with which the input cursor, for the user, is displayed within GUI 200. As another example, one or more other aspects of the drawing may be unique to the user creating the drawing, such as line style (solid, dashes, dots, dash patterns, dot patterns, double lines, etc.), line weight, etc. As yet another example, a drawing annotation may be displayed in visual association with information identifying the source of the annotation, such as a username, a picture, a symbol, initials of the user, etc.

When operating in synchronous mode, a user may only create a drawing annotation when the video is paused according to joint state data 134. However, when operating in asynchronous mode, a user may independently pause the video data and create a drawing annotation on the current video frame for the individual client application. According to some embodiments, whether operating in synchronous or asynchronous mode, information for the drawing annotations is transmitted to VCS 112 and stored in local joint state data 134 such that the drawing annotations may be disseminated to the other client devices, as described in further detail below.

3.7. Sharing Drawing Annotations

According to some embodiments, drawing annotations performed on a particular video frame are shared with other participant client devices. Drawing annotation sharing may be performed explicitly, or may be done in real-time, i.e., as the user creates the annotation. For example, as a drawing annotation on a video frame is being created by a user at a particular client device 130A, one or more drawing instructions for re-creating the drawing annotation are provided to VCS 112 from client application 132A. VCS 112 provides the drawing instructions to the other participant client devices 130B-E. Client application 132 is configured to draw the drawing annotation on the video frame based on the drawing instructions upon receiving the instructions. Thus, when instructions are disseminated by VCS 112 in real-time, all participants to the session are able to view the drawing being created. Furthermore, transmission of the drawing instructions requires very little bandwidth, which conserves resources of network arrangement 100.

Returning to the discussion of flowchart 300 of FIG. 3, at step 308, one or more drawing instructions are received from a particular client device of the plurality of client devices, where the one or more drawing instructions are for recreating a particular drawing annotation performed, at the particular client device, on a particular frame of the plurality of video frames. For example, VCS 112 receives, from client application 132A, a plurality of drawing instructions for recreating a drawing annotation created by user A via GUI 200 displayed at client device 130A.

Figure 4:
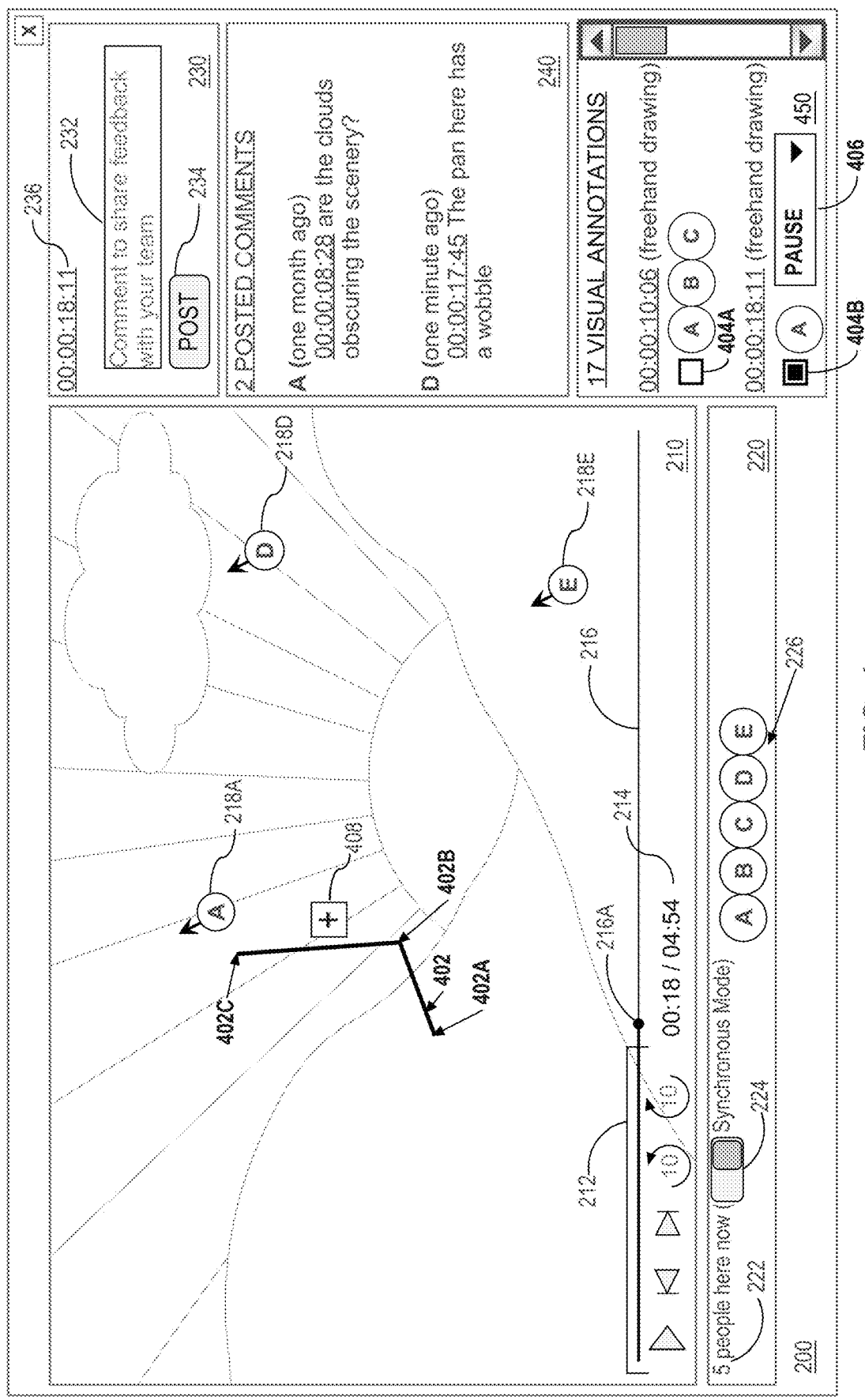
FIG. 4 depicts an example graphical user interface with an example drawing annotation on a video data frame.

To illustrate, FIG. 4 depicts GUI 200 with an example drawing annotation 402 on a current video frame being displayed in video viewing area 210. While drawing annotation 402 is being created, client application 132A generates a plurality of drawing instructions to recreate the drawing annotation. To illustrate in the context of a freeform line, when client application 132A detects a click-and-drag event across area 210 signaling line creation, client application 132A periodically records the coordinates of the input cursor location until there is a button-release event signaling the end of a current line creation. Client application 132A creates a drawing instruction based on each recorded coordinate and sends each drawing instruction to VCS 112 in real-time.

For example, VCS 112 receives, from client application 132A at a first time during the depicted session, the example drawing instruction "start_drawing(user_A, 0.36, 0.60)", where user_A identifies the source of the drawing instructions such as an identifier of user A at client device 130A or an identifier of client device 130A. This instruction is created by client application 132A in response to detecting the initiation of a drawing at the indicated coordinates. Accordingly, this example drawing instruction indicates that the user at client device 130A has started drawing annotation 402 on the current frame of the video data displayed in area 210, where the starting location 402A of drawing annotation 402 is at the coordinates 0.36, 0.60.

At a second time during the session (later than the first time), VCS 112 receives, from client application 132A, a second example drawing instruction "drawing_segment (user_A, 0.45, 0.54)". According to some embodiments, this instruction is created by client application 132A based on a periodic identification of the location of the input cursor while drawing annotation 402 is being created. Periodically creating drawing instructions based on the current state of the drawing annotation allows for the other participants in the session to view the drawing as it is being created. The example drawing instruction communicates that a line should be drawn between the last-sent coordinates (location 402A) and coordinates 0.45, 0.54 (location 402B). This second example instruction is a non-terminal or intermediate drawing instruction, which provides additional information about the drawing without signaling drawing completion.

At a third time during the session (later than the second time), VCS 112 receives, from client application 132A, a third example drawing instruction "end_drawing(user_A, 0.43, 0.29)". This drawing instruction is a terminating drawing instruction indicating completion of the current drawing. Client application 132A creates this terminating instruction in response to detecting termination of drawing annotation 402 when input cursor representation 218A is at location 402C (coordinates 0.43, 0.29), e.g., based on the user releasing the click-and-drag action at location 402C. Further, this example instruction communicates that a line should be drawn between the last-sent coordinates (location 402B) and location 402C.

According to some embodiments, a user creating a particular annotation, such as drawing annotation 402, may associate metadata with the annotation. To illustrate, FIG. 4 depicts a metadata control 408 visually associated with drawing annotation 402. Activation of metadata control 408 causes GUI 200 to include a form with one or more text input fields that allows input of metadata for the annotation, which may include a title, a type, an importance level, a text comment, a tag (such as a hashtag), a user identifier, a workstream identifier, a team identifier, etc. This metadata is associated with the visual annotation, and is disseminated with the information for the visual annotation. According to an embodiment, metadata associated with an annotation may be depicted with representations of the associated annotation, e.g., in area 210, area 240, area 250, etc.

At step 310 of flowchart 300, the one or more drawing instructions are transmitted to each client device of the plurality of client devices other than the particular client device, said each client device being configured to draw, based on the one or more drawing instructions, the particular drawing annotation on the particular frame displayed at said each client device. For example, VCS 112 transmits the drawing instructions received from client application 132A to each of the other participant client devices 130B-E via network 120. According to some embodiments, VCS 112 further communicates a frame identifier of the video frame on which the drawing was created.

Each client device 130 is configured to execute the drawing instructions on the indicated video frame. If the indicated video frame is currently displayed by client application 132 (e.g., client application 132A is in synchronous mode when the drawing annotation is created and the receiving client application 132 is also in synchronous mode), the receiving client application executes the drawing instructions in real-time, i.e., within a threshold amount of time of receiving the drawing instructions. According to some embodiments, the receiving client application identifies a look and feel for the drawing annotation, created using the received drawing instructions, based on the source identifier. According to another embodiment, VCS 112 sends information for the look and feel of the drawing annotation to the receiving client application, e.g., as a part of the drawing instruction. To illustrate, VCS 112 includes, in each drawing instruction, a color code indicating a color for the drawing annotation created based on the drawing instruction.

According to some embodiments, drawing instructions may be received, at VCS 112, from multiple participant client devices during the same timeframe. For example, after receiving the first example drawing instruction and before receiving the second example drawing instruction from client application 132A, VCS 112 receives a drawing instruction from client application 132E. VCS 112 disseminates the drawing instruction from client application 132E in real-time as described above in connection with the example drawing instructions from client application 132A. Client application 132 is configured to create drawings from different sources concurrently as drawing instructions from the multiple sources are received from VCS 112.

3.8. Explicit Sharing of Drawing Annotations

According to some embodiments, client application 132 may automatically send drawing instructions to VCS 112 as they are identified, e.g., in real time, or client application 132 may send drawing instructions in response to detecting an explicit instruction to share the drawing instructions. Specifically, according to some embodiments, client application 132 provides an option to create drawing annotations without automatically sharing the drawing with other session client applications, e.g., drawing suppression mode. While client application 132 is in drawing suppression mode, drawing annotations created at the application may be created and stored only to the local joint state data 134 (e.g., with a "local" tag to indicate that the drawing was not shared), and/or may be deleted without sharing the annotation.

Furthermore, a drawing annotation created while client application 132 is in drawing suppression mode may be modified until the user is satisfied, where drawing instructions are sent to VCS 112 for dissemination in response to an explicit share command at the client application. When a drawing annotation is explicitly shared, client application 132 either (a) sends, to VCS 112, drawing instructions generated during the drawing annotation creation process, including instructions for portions of the drawing that are not included in the final drawing annotation, or (b) generates a set of drawing instructions that reflect the final drawing annotation and sends the generated set of drawing instructions to VCS 112.

For example, as depicted in FIG. 4, while client application 132A is in synchronous mode and in drawing suppression mode, drawing annotation 402 is created on a current video frame displayed in GUI 200 of client application 132A, e.g., while the users are discussing other aspects of the project or frame. When user A is prepared to share drawing annotation 402, either because the drawing annotation is fully prepared or the discussion is ready for the drawing, user A uses a menu of GUI 200 or a dedicated function key/combination of keys to send drawing instructions for the annotation to VCS 112.

VCS 112 receives the instructions for drawing annotation 402, as a set, from client application 132A and, within a threshold amount of time of receiving the set of instructions, automatically sends the set of instructions to each of client devices 130B-E. Client application 132 at each participant client device that displays the indicated video frame automatically uses the set of drawing instructions to create drawing annotation 402 on the video frame, which allows the participants to view drawing annotation 402 in real-time with respect to the explicit instruction from user A to share the annotation.

4. Video Playback with Drawing Annotations

According to some embodiments, each client application 132 stores received drawing instructions in local joint state data 134. Client application 132 re-creates drawing annotations for a displayed video frame using the drawing instructions associated with video frame in local joint state data 134. During the session, playback of the video data may include display of drawing annotations or exclude drawing annotations. Based on user preferences, VCS 112 may cause video playback to skip all annotations, or to show one or more drawing annotations according to a selected display mode, as described in further detail below.

According to some embodiments, users may identify one or more annotated video frames on which to display annotations during playback, and selection data is disseminated to joint state data 134 maintained by participant client devices. Such selection information may also be persisted to session data 142 for later review.

For example, drawing annotation area 450 in GUI 200 depicted in FIG. 4 includes annotation inclusion controls 404A and 404B, which, when set to the on position (such as with annotation inclusion control 404B), causes the drawing annotations in the associated video frame to be displayed during playback. In example area 450, annotation inclusion control 404A is set to the off position, and playback of the video data will exclude drawing annotations on the associated video frame at time 00:00:10:06. However, annotation inclusion control 404B is set to the on position, and playback of the video data will exclude drawing annotations on the associated video frame at time 00:00:18:11 (i.e., the currently-viewed video frame).

According to the embodiment shown in FIG. 4, because control 404B is set to the on position, an additional display mode control 406 is made available for the associated video frame. In this example, display mode control 406 is a drop-down box with a (hidden) list of options, among which "PAUSE" has been selected. Available display modes may include options to: display annotations on the video frame during normal speed playback; slow down on the indicated frame with drawing annotations (including slowing down on zero or more frames before and/or after the annotated frame); or pause on the associated frame with drawing annotations (e.g., the selected "PAUSE" option).

For example, during video playback based on the example drawing annotation display options selected in drawing annotation area 450 of FIG. 4, client application 132 displays the video frame at timestamp 00:00:10:06 without displaying any drawing annotations on the frame. Further, when playback reaches the video frame at timestamp 00:00:18:11, client applications 132 pauses playback and re-creates drawing annotation 402 in area 210 based on the drawing instructions stored in joint state data 134 associated with the video frame.

5. Joint State Data Persisted as Session Data

According to some embodiments, VCS 112 persists joint session data generated during a particular session for future review, e.g., as session data 142 in data store 140 of FIG. 1. For example, joint session data generated by VCS 112 is persisted based on a retention policy, which may be established by a session master described in further detail below. The retention policy indicates what types of data from the generated joint session data is persisted to session data 142. To illustrate, a retention policy may indicate one or more types of data to persist, such as: an events timeline, drawing annotation data, comment annotation data, annotation data from one or more sources, co-presence data (such as cursor data), video playback instructions, etc. If a retention policy indicates that an events timeline should be persisted, instructions recorded in session data 142 are associated with timestamps indicating the original timing of the instructions during the recorded session.

5.1. Reviewing Session Data

Based on session data 142, the recorded video collaboration session may be reviewed after the session is complete. For example, after completion of a session that was persisted in session data 142, VCS 112 receives a request to review session data 142 from a client device 130F. Accordingly, VCS 112 provides session data 142 to client device 130F, which stores the session data as joint state data 134F. A client application 132F running on client device 130F uses joint state data 134F to review the session. Client application 132F may provide controls for session review, such as controls for which drawing annotations to display, what display mode to use for displaying the annotations, whether and how to use an events timeline, etc.

Client application 132F may use a stored events timeline to cause instructions (including drawing instructions, and/or playback instructions) to be performed in an order in which the instructions were received, or to be performed with timing that mirrors the original timing during the session. For example, events timeline data may be used to cause drawing annotations to be re-created during session review based on the order of received drawing instructions. The timing of drawing instruction execution during session review may comprise a fixed amount of delay between drawing instruction execution, or may mirror the timing of the original instructions as indicated by associated events timeline timestamps.

As a further example, client application 132F may cause playback instructions in joint state data 134F to be executed based on a stored events timeline, which facilitates review of the session in connection with audio and/or video generated by participant users during the session. According to some embodiments, when playback instructions are executed based on a stored events timeline, representations of input cursors from one or more of the session participants may also be displayed, i.e., based on cursor data associated with events timeline timestamps stored in joint state data 134F. According to some embodiments, GUI 200 includes a control to show/hide input cursor representations during session review. These controls may allow selective display of cursor representations associated with particular users.

5.2. Adding Annotations after Session Completion

According to some embodiments, the video annotations recorded for video data in session data 142 may be adjusted. Such adjustments may include adding an annotation to the session data, either (a) during session review, or (b) during a separate session. For example, during session review at client application 132F, a user creates a comment annotation or drawing annotation for a particular video frame. Accordingly, client application 132F sends information for the annotation to VCS 112. The annotation may be associated with an "out-of-session" tag or with an identifier of a user F authenticated with client application 132F. In future reviews of session data 142, the out-of-session annotation is available, e.g., in posted comments area 240 or visual annotations area 250, and may be associated with a visual out-of-session identifier.

New annotations may be stored in session data 142 or in second session data 144 in data store 140, which may be configured by VCS 112 as a separate session that is reviewable independent of session data 142 or may be configured as auxiliary data to session data 142 that is reviewable in connection with session data 142. According to some embodiments, session data 142 is modified to include a reference to session data 144.

To illustrate review of session data with out-of-context annotations, after creation of session data 144 with one or more out-of-session annotations, VCS 112 receives a request to review session data 142 from a client device 130G. Accordingly, based on a reference to session data 144 in session data 142, VCS 112 provides session data 142 and session data 144 to client device 130G, which stores the session data as joint state data 134G. A client application 132G running on client device 130G uses joint state data 134G to review the session with the out-of-session annotations stored in joint state data 134G. For example, a particular frame of video data is associated with both drawing annotations from the original session and out-of-session drawing annotations. Upon displaying the particular frame in area 210, client application 132G causes both the drawing annotations from the original session and the out-of-session drawing annotations to be re-created in area 210, e.g., with visual "out-of-session" indicators associated with the out-of-session drawing annotations.

6. Additional Co-Presence Context

It can be useful, during a discussion of video data, to know that a particular user is about to perform, or has performed, an action that affects the joint state of a session such as video playback, or annotation creation. Collaborative video sessions can become disorganized when multiple people try to express different ideas at the same time. Information about the actions of session participants can help the other participants to have context for their own actions, which facilitates communication and smoother transitions during a collaboration session. These benefits allow a collaboration session to take less time and computing resources to complete. Further, in-person meetings provide context clues to people's behavior that are not available in an online setting. Session context information provided throughout a video collaboration session can further help the session participants to feel more connected, and help the participants to work together more easily.

Thus, according to some embodiments, VCS 112 receives and disseminates co-presence information for context events occurring during a video collaboration session, where context events are actions performed by session participants such as one or more of: interaction with a video playback control, interaction with an annotation control, joining or leaving a session, entering or exiting a particular mode (i.e., stealth mode, drawing suppression mode, synchronous mode, asynchronous mode), etc. Interaction with a control comprises any kind of interaction including activating the control, rolling over the control, clicking on a control, typing text into a text box control, requesting to view a set of controls (such as drawing controls), etc. Upon receiving co-presence information describing a particular context event, client application 132 is configured to display, in GUI 200, a visual co-presence notification with information for the particular context event. According to some embodiments, the co-presence information is also stored in joint state data maintained for the session.

To illustrate, VCS 112 receives, from a particular client device of a plurality of client devices participating in a video collaboration session, user interaction information reflecting a user interaction with a graphical user interface displayed by the particular client device. For example, user B at client device 130B rolls over or activates one of controls 212 in GUI 200 displayed at the client device. Client application 132B at client device 130B sends co-presence information to VCS 112 that describes this context event.

According to some embodiments, in response to receiving the user interaction information, VCS 112 transmits, to each client device of the plurality of client devices other than the particular client device, the user interaction information, said each client device being configured to display, in real-time, a visual representation of the user interaction information. For example, VCS 112 sends the received co-presence information with an identifier of the source of the co-presence information to client devices 130A and 130C-E.

Figure 5:
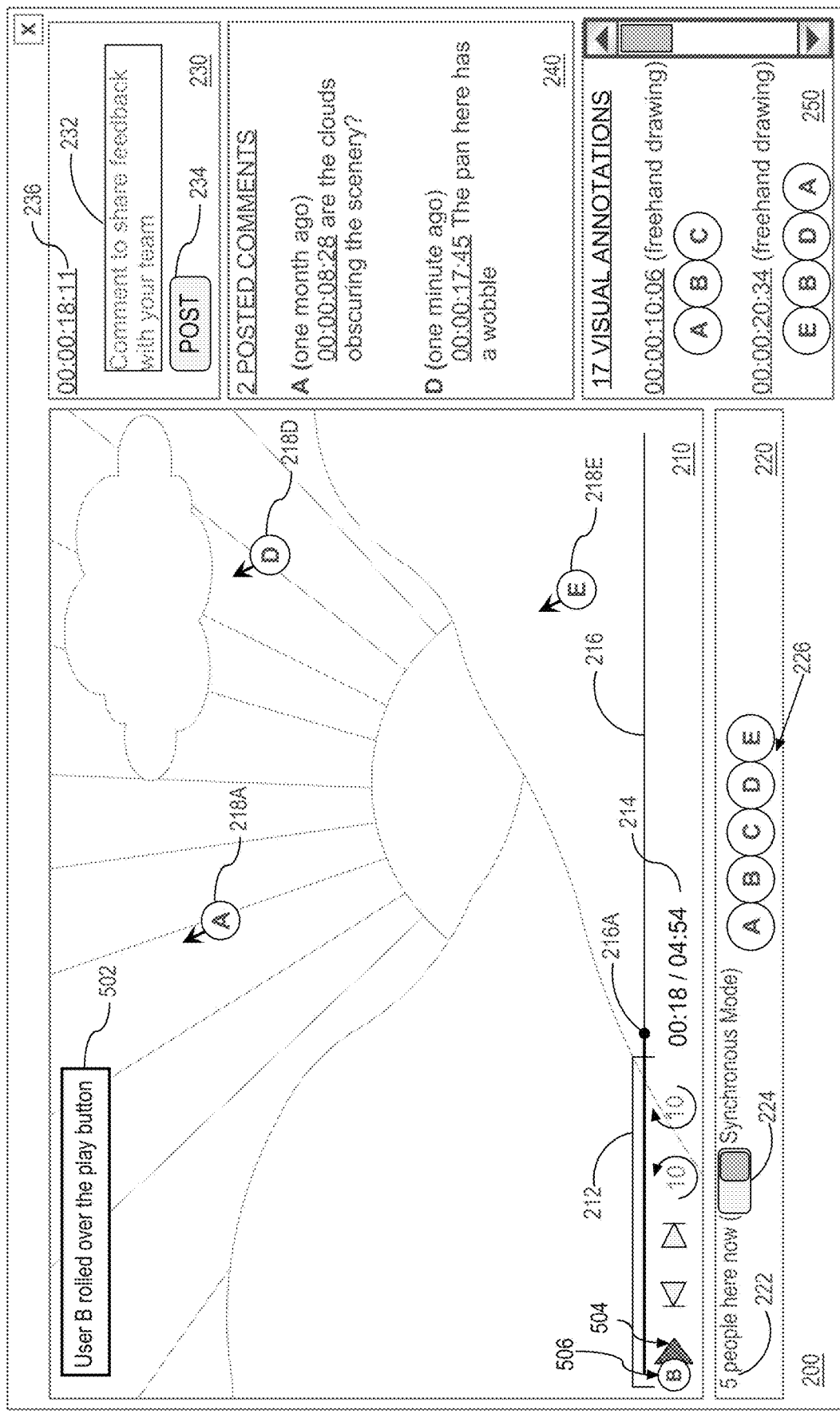
FIG. 5 depicts an example graphical user interface with example co-presence indicators.

Client application 132 is configured to display a visual indication of the context event reflected in the co-presence information. To illustrate, in response to receiving the co-presence information from VCS 112, client device 130A displays a visual indication, in GUI 200, describing the context event. For example, FIG. 5 depicts GUI 200 with a context message 502 that comprises a visual indication of the context event described in the received co-presence information.

As another example, the visual indication of the context event is associated with a control, in GUI 200, that corresponds to the context event. The visual indication associated with a control in GUI 200 may comprise any change in the look and feel of the control, such as one or more of: a color change, a size change, a line weight change, an outline color change, animation (such as blinking), visual association with an icon, visual association with a user identifier, etc. To illustrate, FIG. 5 depicts a highlight 504 is applied to the play control, which client application 132 displays in response to receiving co-presence information describing the context event of a user (user B) rolling over the play control. As another example, in response to receiving the co-presence information describing the context event of a user (user B) rolling over the play control, a user identifier 506 is visually associated with the play control. While the play control is the subject of this example, any control in GUI 200 may be associated with a visual context event indication.

According to some embodiments, a user may suppress visual context event indications, e.g., by suppressing all visual indications, suppressing visual indications based on a type of context event, suppressing visual indications based on a user that initiated the context event, etc.

According to some embodiments, VCS 112 includes the co-presence information in session data 142 recorded for the video collaboration session. The co-presence information recorded in session data 142 may be associated with event timeline timestamps, such that review of the session data may include visual context event indications displayed during the original session.

7. Video Progression Freeze Condition

When a first user is performing a frame-specific interaction with client application 132, such as creating a drawing annotation on a particular frame of video data, it can be very disruptive for another user to cause VCS 112 to move the video away from the particular frame. To address this issue, VCS 112 freezes a current video timestamp indicated in the joint state data for a session in response to detecting a freeze condition that, according to some embodiments, is based on real-time drawing updates being received by VCS 112.

FIG. 6 depicts a flowchart 600 for detecting and enforcing a freeze condition for a current video timestamp in joint state data maintained for a video collaboration session. Specifically, at step 602 of flowchart 600, video data is concurrently streamed to a plurality of client devices based, at least in part, on joint state data that comprises a current frame value identifying a currently-viewed frame of a plurality of video frames of the video data. For example, VCS 112 receives requests for client devices 130A-E to join a particular video collaboration session established by VCS 112 (as described in detail above). VCS 112 provides each of client devices 130A-E with joint state data 134 for the requested session, which indicates video data for the session, and a current video timestamp that identifies a synchronously-viewed (or current) frame for the video data. VCS 112 causes the video data to be streamed to each of client devices 130A-E, which, when in synchronous mode, display the streamed video at the current video timestamp indicated in joint state data 134.

Figure 7A:
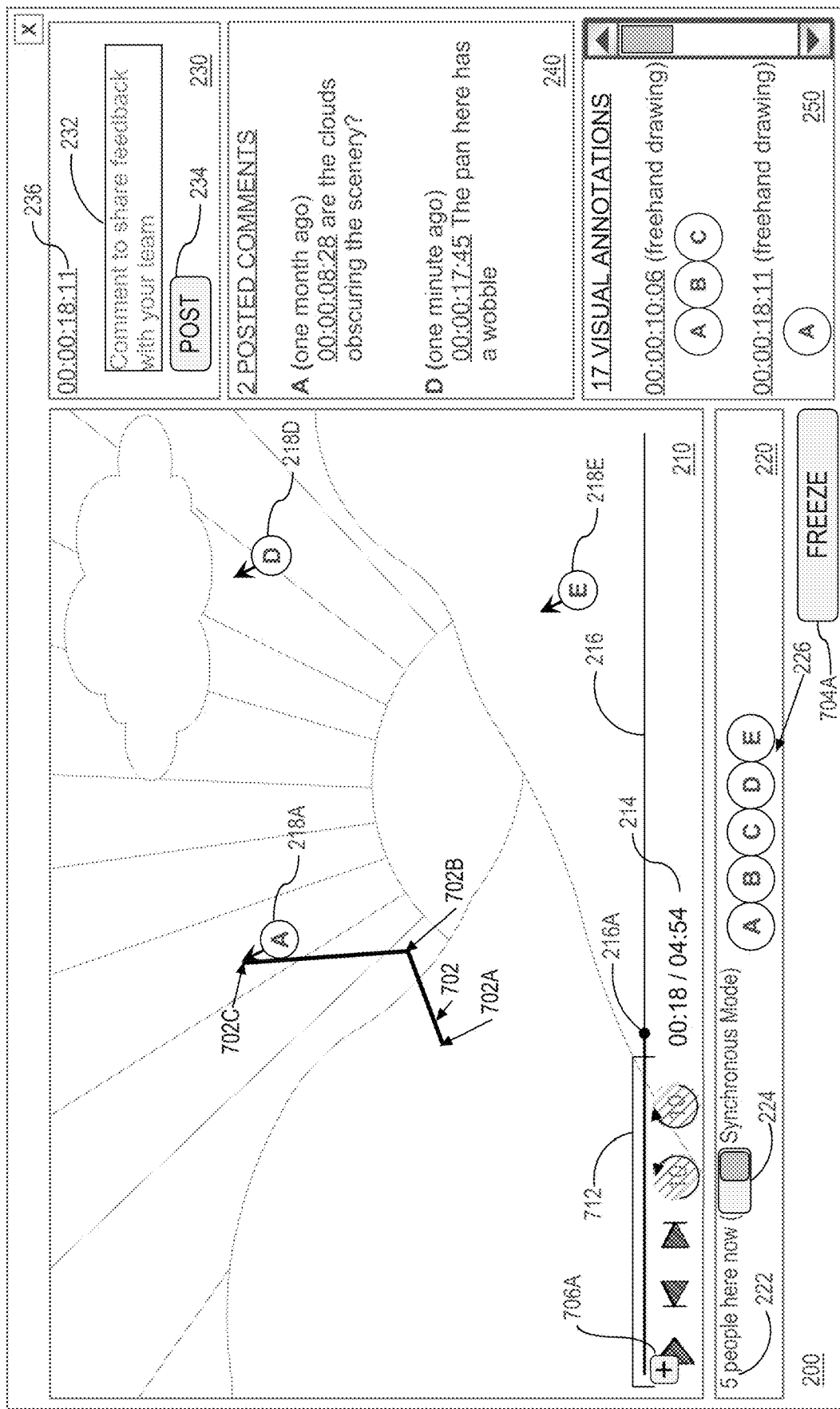
FIGS. 7A-B depict example graphical user interfaces with example drawing annotations and example visual video freeze indicators.

At step 604 of flowchart 600, a plurality of real-time drawing data updates for a drawing annotation performed on a particular frame of the plurality of video frames at a particular client device, of the plurality of client devices, are received from the particular client device, the plurality of real-time drawing data updates being received in real time over a particular timespan. For example, as depicted in FIG. 7A, VCS 112 receives a plurality of drawing instructions for re-creating a drawing annotation 702 created at client application 132A running on client device 130A.

To illustrate, VCS 112 receives, at a first time during the depicted session, the example drawing instruction "start_drawing(user_A, 0.36, 0.60)", where user_A is an identifier the source of the drawing instruction, and coordinates 0.36, 0.60 identify location 702A. At a second time during the session (later than the first time), VCS 112 receives a second example drawing instruction "drawing_segment(user_A, 0.45, 0.54)", where coordinates 0.45, 0.54 identify location 702B. At a third time during the session (later than the second time), VCS 112 receives a third example drawing instruction "drawing_segment(user_A, 0.43, 0.29)", where coordinates 0.43, 0.29 identify location 702C. Note that none of the received drawing instructions are terminating drawing instructions.

At step 606 of flowchart 600, during the particular timespan, each real-time drawing data update of the plurality of real-time drawing data updates is transmitted to each client device of the plurality of client devices other than the particular client device, said each client device being configured to display, during the particular timespan and based on each real-time drawing data update of the plurality of real-time drawing data updates, an updated version of the drawing annotation on the particular frame displayed at said each client device. For example, in real-time with respect to the first time during the session, VCS 112 sends the first example drawing instruction ("start_drawing(user_A, 0.36, 0.60)") to each of client devices 130B-E, which are the participant client devices participating in the session other than the source client device of the instruction. Similarly, in real-time with respect to the second time during the session, VCS 112 sends the second example drawing instruction ("drawing_segment(user_A, 0.45, 0.54)") to each of client devices 130B-E. Further, in real-time with respect to the third time during the session, VCS 112 sends the third example drawing instruction ("drawing_segment(user_A, 0.43, 0.29)") to each of client devices 130B-E. Using these received instructions, the client application 132 is able to re-create drawing annotation 702 being created at client application 132A.

According to some embodiments, these drawing instructions received at VCS 112 are also stored (in explicit association with an identifier of the frame on which the drawing annotation was created) to the joint state data for the session. Thus, any participant client application that joins the session (and receives the joint state data for the session) after the time that a stored drawing instruction is received will receive the persisted drawing instruction to perform on the indicated frame.

At step 608 of flowchart 600, a freeze condition is detected based on the plurality of real-time drawing updates. A freeze condition is an occurrence that causes VCS 112 to freeze the current frame of the joint state data. A freeze condition is considered "active" until the freeze condition is "lifted", or the freeze condition is no longer applicable. Freezing the current frame of the joint state data comprises maintaining a current value of the current frame number or current video timestamp of the joint state data, which causes the session participants that are in synchronous mode to continue viewing the current frame indicated in the joint state data, even if synchronous video playback instructions are received to the contrary. Freezing the current frame of the joint state data allows participants in the session, that are operating in synchronous mode, to complete frame-specific actions before the synchronized current frame is moved away from the frame to which the frame-specific actions apply.

According to some embodiments, detection of a freeze condition may be implicit, indicated by VCS 112 detecting that a synchronized frame-specific action is being performed or is likely imminent, such as receiving co-presence data indicating a context event describing an interaction with annotation tools (e.g., drawing tools or comment tools in area 230, etc.) within a threshold amount of time of the current time by a client application that is in synchronous mode. As another example implicit detection of a freeze condition, VCS 112 receives, from a client application that is in synchronous mode, drawing instructions for a drawing annotation on the current video frame (a) within a threshold amount of time of the current time, or (b) without receiving a terminating drawing instruction indicating completion of the current drawing, etc. Furthermore, detection of a freeze condition may be explicit, such as receiving a request from a client application to impose a freeze condition.

To illustrate step 608, VCS 112 detects a freeze condition based on having received one or more drawing instructions, from client application 132A in synchronous mode, for a current frame indicated in the joint state data without having received a terminating drawing instruction. To illustrate in the context of drawing annotation 702, the last drawing instruction received by VCS 112 was an intermediate-type drawing instruction ("drawing_segment(user_A, 0.43, 0.29)"). Thus, VCS 112 detects an active freeze condition for the current frame of the joint state data.

To illustrate an explicitly-detected freeze condition, FIG. 7A depict GUI 200 displayed on client device 130C that includes a freeze control 704A. A user C, at client device 130C, activates freeze control 704A, based on which VCS 112 detects a freeze condition precipitated by client device 130C. This freeze condition may concurrently exist with other detected freeze conditions (e.g., with the implicit freeze condition precipitated by client device 130A based on drawing instructions for drawing annotation 702).

At step 610 of flowchart 600, based on the detected freeze condition, the current frame value, in the joint state data, is frozen at the particular frame. For example, in response to detecting the active freeze condition, VCS 112 freezes the current video timestamp or current frame value in the joint state data for the current session. According to some embodiments, freezing the current frame value, in the joint state data, at the particular frame comprises causing video playback controls, displayed at one or more client devices of the plurality of client devices, to be disabled.

According to another embodiment, freezing the current frame value, in the joint state data, at the particular frame comprises ignoring video playback instructions from participant client devices, participating in the session, until the freeze condition is lifted. In this embodiment, VCS 112 receives, from a second client device of the plurality of client devices other than a client device that precipitated the freeze condition (e.g., client device 130A), a video playback instruction to change the current frame value in the joint state data. After receiving the video playback instruction, and based, at least in part, on the detected freeze condition, VCS 112 maintains the current frame value, in the joint state data, identifying the particular current frame being synchronously displayed from the video data.

7.1. Lifting the Video Progression Freeze Condition

In order to unfreeze the current frame of the joint state data, no active freeze conditions may be in effect. According to some embodiments, the freeze condition may be lifted implicitly or explicitly. For example, VCS 112 may detect an implicit lift of a previously-detected freeze condition based on determining that the threshold amount of time since detecting the freeze condition has lapsed, or based on receiving a terminating drawing instruction from the client device whose drawing instructions precipitated the freeze condition.

Figure 7B:
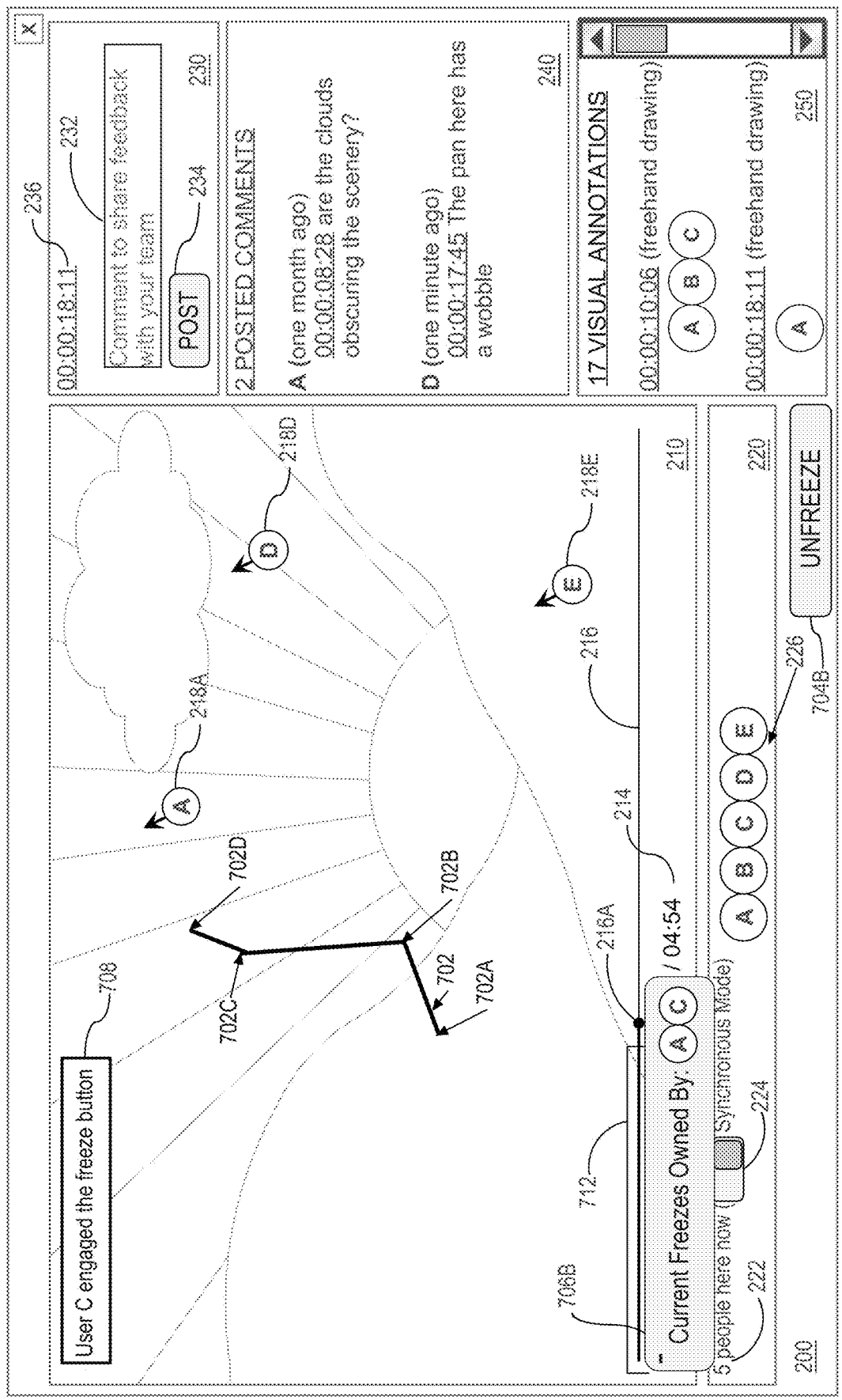

For example, as depicted in FIG. 7B, VCS 112 receives a further drawing instruction for a drawing annotation 702. Specifically, in this example, VCS 112 receives, at a fourth time during the depicted session (after the third time referenced in the example drawing instructions above), a fourth example drawing instruction "end_drawing(user_A, 0.46, 0.22)" from client device 130A. This drawing instruction is a terminating instruction, e.g., caused by user A disengaging the drawing mechanism of GUI 200 that ends the third drawing segment of drawing annotation 702 at location 702D (coordinates 0.46, 0.22). Based on receiving the terminating drawing instruction from client device 130A, VCS 112 detects an implicit lift to the previously-detected freeze condition precipitated by drawing instructions from the same client device.

Multiple freeze conditions may be active during the same time period. For example, drawing instructions are received from multiple client devices during the same time period, and VCS 112 detects a distinct freeze condition for each of the multiple client devices based on the drawing instructions from each client device. When multiple freeze conditions are simultaneously active, VCS 112 maintains a freeze on the current frame of the joint state data until all of the freeze conditions are lifted.

Furthermore, VCS 112 may detect an explicit lift of a previously-detected freeze condition, e.g., based on receiving an instruction to lift the freeze condition. More specifically, an explicitly-requested freeze condition requested by a particular client device may be lifted by an instruction to unfreeze the frame from the same client device. For example, a particular freeze condition is precipitated by an explicit freeze request from client application 132C. As depicted in FIG. 7B, because activation of freeze control 704A (of FIG. 7A) of client application 132C precipitated a currently-active freeze condition, GUI 200 of client application 132C displays an unfreeze control 704B. Unfreeze control 704B may be activated, e.g., by user C at client application 132C, to explicitly lift the freeze condition precipitated by that client device.

7.2. Visual Video Freeze Indication

According to some embodiments, based on an active freeze condition being in effect, VCS 112 causes a visual video freeze indication to be displayed by one or more client devices of the plurality of client devices. A visual video freeze indication may be associated with one or more of the video playback controls in client application 132 in synchronous mode, and may comprise a look and feel for the controls that is distinct from a non-freeze look and feel. For example, based on one or more active freeze conditions, VCS 112 causes video playback controls 712 (depicted in FIGS. 7A-7B) to be displayed with example video freeze indications, in that the video playback controls have a different look and feel from example controls 212 displayed without visual video freeze indications.

As another example, a visual video freeze indication may identify the source(s) of one or more active freeze conditions. To illustrate, FIG. 7A includes a minimized freeze information control 706A. According to some embodiments, minimized freeze information control 706A is a visual video freeze indication that is displayed in GUI 200 at participant client devices in synchronous mode when there is an active freeze condition. When activated, minimized freeze information control 706A expands to maximized freeze information control 706B, which includes information regarding users or client devices that precipitated the one or more active freeze conditions. In this example, user A is currently drawing, and user C has explicitly requested a video freeze. Activation of maximized freeze information control 706B returns the control to minimized freeze information control 706A.

According to another embodiment, a visual video freeze indication may not be visually associated with video playback controls. For example, in FIG. 7B, context message 708 indicates that user C has activated freeze control 704A. In this example, context message 708 is displayed by client application 132C, which precipitated the freeze condition that is the topic of the visual video freeze indication. However, according to some embodiments, such a context message is displayed at client applications that did not precipitate the freeze condition that is the topic of the visual video freeze indication.

8. Session Master

One or more session masters may perform administrative functions for a session, such as setting session options, mediating freeze conditions, and controlling mode options for session participants, and/or controlling modes in which client applications function. According to some embodiments, one or more of client devices 130A-E or one or more user identifiers are identified, in the joint state data of an established session, as session masters. For example, the master of a particular session is the client device from which the request to initiate the session originated, or the master of a particular session is identified based on a user identifier included in the request to initiate the session, etc.

A session master of a particular session may grant or revoke, to other participants in the session, permission to perform actions in a session such as adding annotations, controlling video playback, etc. Furthermore, a session master may determine which participant annotations are persisted to session data 142 on, e.g., based on user identifier, a role of the user, etc. Specifically, in addition to the session master role, participants in a session may be assigned roles such as "principal collaborator", "secondary collaborator", "observer", etc.

Furthermore, a session master may determine whether a particular participant may operate in a particular mode such as stealth mode, asynchronous mode, or drawing suppression mode. Furthermore, the session master may determine what kind of co-presence data is communicated and/or represented by client applications participating in the session, whether a user may opt out of co-presence notifications, and what kind of co-presence data may be persisted in the session data 142.

Furthermore, the session master may control the look and feel of drawing annotations, such as assigning particular colors to identify particular users for input cursor representations and/or for drawing annotations, whether users may select colors for effect rather than identification, whether a user identifier is displayed in connection with a drawing annotation, what drawing tools are available for the session, etc.

According to some embodiments, permission from a session master is required for a session participant to perform one or more actions, such as actions that affect video playback, add an annotation to the video data, or enter or exit a particular mode (i.e., stealth mode, drawing suppression mode, synchronous mode, asynchronous mode). For example, VCS 112 receives a notification of an action that requires session master permission, and in response, requests permission to follow the instruction from the session master. VCS 112 performs the action (and performs any other tasks for the action, such as storing an instruction in session data, or sending co-presence information describing the action, etc.) in response to receiving permission from the session master. If permission is denied, VCS 112 does not perform the action and notifies the requesting client application 132 that permission was denied, where client application 132 is configured to display this information in GUI 200.

Furthermore, a master of the session may cause one or more freeze conditions to be lifted based on an explicit lift of the freeze conditions or on an implicit lift of the freeze conditions. For example, a master of the session may have access to a list of active freeze conditions associated with options to explicitly lift any of the active freeze conditions. As another example, a master of the session may have, in their GUI 200, a master unfreeze control that lifts all active freeze conditions. As yet another example, a master of the session may implicitly instruct that all active freeze conditions be lifted by activating one or more of video playback controls 212.

9. Computing System Implementation

FIG. 1 is a block diagram that depicts an example network arrangement 100 for efficient communication among client devices during a video collaboration session. Network arrangement 100 includes a server device 110 and client devices 130A-N communicatively coupled via a network 120. While embodiments are described herein in connection with example network arrangement 100, they are not limited thereto. For example, embodiments may be implemented by a peer-to-peer system with the functionality of VCS 112 described herein being implemented at the peer level.

Client devices 130A-N may be implemented by any type of computing device that is capable of communicating with server device 110 over network 120. Example implementations of client devices 130A-N include, without limitation, workstations, personal computers, laptop computers, personal digital assistants (PDAs), tablet computers, cellular telephony devices such as smart phones, and any other type of computing device. In network arrangement 100, each of client devices 130A-N (also referred to generally as client device 130) is configured with a client application 132. Each of client applications 132A-N may be implemented in any number of ways, including as a stand-alone application running on client device 130, as a plugin to a browser running at client device 130, as a webpage loaded into a browser running at client device 130, etc. Client devices 130A-N may be configured with other mechanisms, processes, and functionalities, depending upon a particular implementation.

Network 120 may be implemented with any type of medium and/or mechanism that facilitates the exchange of information between client devices 130A-N and server device 110. Furthermore, network 120 may facilitate use of any type of communications protocol, and may be secured or unsecured, depending upon the requirements of a particular embodiment.

Server device 110 may be implemented by any type of computing device that is capable of communicating with client devices 130A-N over network 120. In network arrangement 100, server device 110 is configured with VCS 112. Any of the functionality attributed to VCS 112 herein may be performed by another entity running on server device 110, or by another entity on client device 130 or on other devices that are communicatively coupled to network 120 (not depicted in FIG. 1), according to some embodiments. Server device 110 may be configured with other mechanisms, hardware, processes, and functionalities, depending upon a particular implementation.

Server device 110 is communicatively coupled to a data store 140. Data store 140 maintains information for session data 142 and session data 144. Data store 140 may reside (in whole or in part) in any type of storage, including volatile and non-volatile storage (e.g., random access memory (RAM), a removable or disk drive, main memory, etc.), and may be implemented by one or more databases. The storage on which data store 140 resides may be external or internal to server device 110.

10. Example Content Management System

Figure 8:
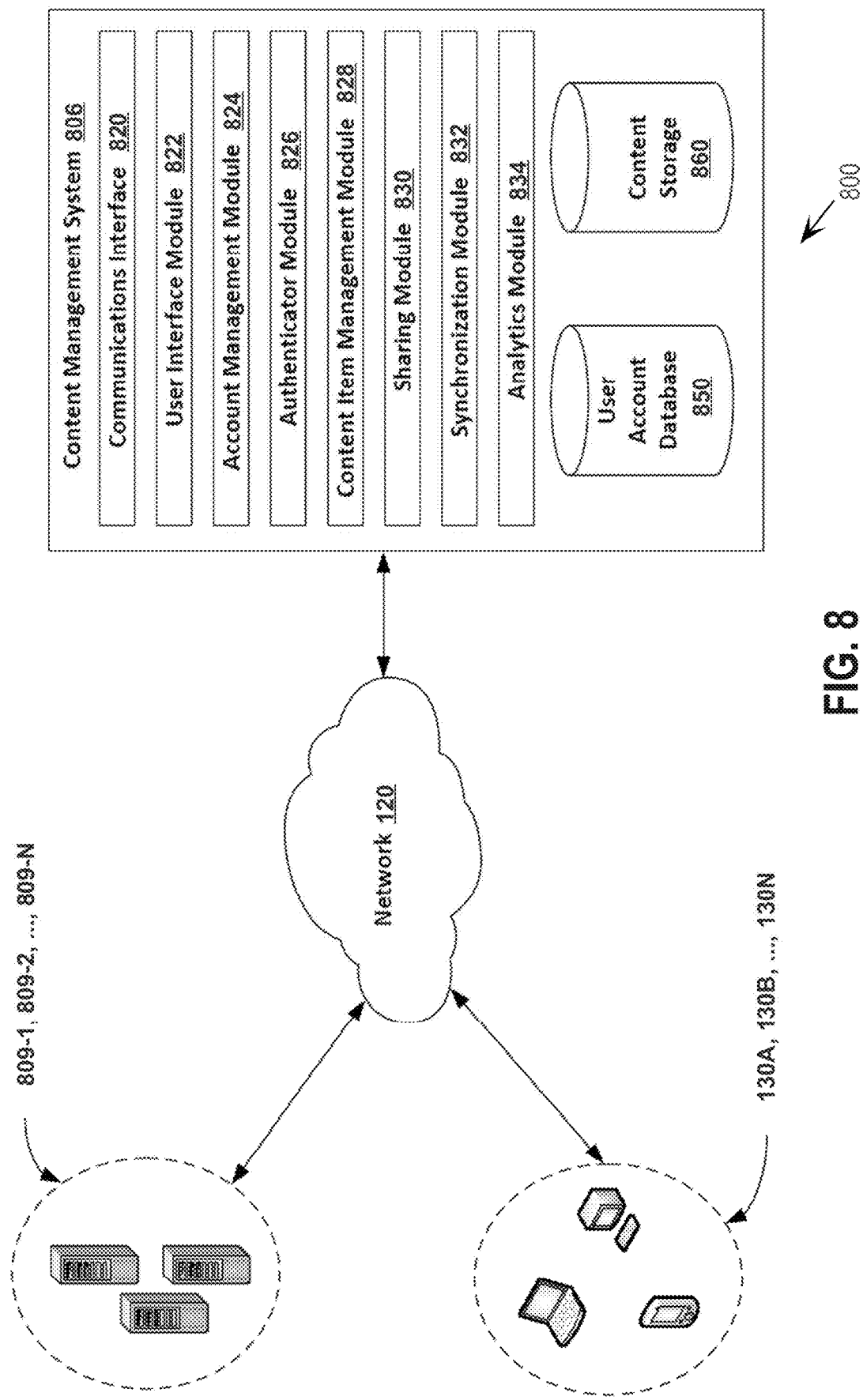
FIG. 8 depicts an example content management system.

With respect to implementing various embodiments of the disclosed technology, an example system configuration 800 is shown in FIG. 8, wherein electronic devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, an end-user can interact with content management system 806 (e.g., an online synchronized content management system) through client devices 130A-N (collectively "130") connected to network 120 by direct and/or indirect communication. Content management system 806 can include a single computing device (e.g., a server) or multiple computing devices (e.g., multiple servers) that are configured to perform the functions and/or operations necessary to provide the services described herein.

Content management system 806 can support connections from a variety of different client devices, such as: desktop computers; mobile computers; mobile communications devices, e.g., mobile phones, smart phones, tablets; smart televisions; set-top boxes; and/or any other network enabled computing devices.

Client devices 130 can be of varying type, capabilities, operating systems, etc. Furthermore, content management system 806 can concurrently accept connections from and interact with multiple client devices 130.

An end-user can interact with content management system 806 via a client-side application installed on client device 130X, such as client application 132. In some embodiments, the client-side application can include a content management system specific component. For example, the component can be a stand-alone application, one or more application plug-ins, and/or a browser extension. However, the end-user can also interact with content management system 806 via a third-party application, such as a web browser, that resides on client device 130X and is configured to communicate with content management system 806. In either case, the client-side application can present a user interface (UI) for the end-user to interact with content management system 806. For example, the end-user can interact with the content management system 806 via a client-side application integrated with the file system or via a webpage displayed using a web browser application. Furthermore, the client-side application can interact with content management system 806 implicitly, as described above in connection with joint state data 134.

Content management system 806 can enable an application or end-user to store content items, as well as perform a variety of content management tasks, such as retrieve, modify, browse, and/or share the content items. Furthermore, content management system 806 can enable an end-user or application to access the content from multiple client devices 130. For example, client device 130X can upload content, as described above, to content management system 806 via network 120. Later, the same client device 130X or some other client device 130Y can retrieve the content from content management system 806. For example, the retrieved content may be an update to joint state data 134A.

To facilitate the various content management services, an end-user can create an account with content management system 806. User account database 850 can maintain the account information. User account database 850 can store profile information for registered users. In some cases, the only personal information in the user profile can be a username and/or email address. However, content management system 806 can also be configured to accept additional user information such as birthday, address, billing information, etc.

User account database 850 can include account management information, such as account type (e.g., free or paid), usage information, (e.g. file edit history), maximum storage space authorized, storage space used, content storage locations, security settings, personal configuration settings, content sharing data, etc. Account management module 824 can be configured to update and/or obtain user account details in user account database 850. The account management module 824 can be configured to interact with any number of other modules in content management system 806.

An account can be used to store content items, such as digital data, documents, text files, audio files, video files, etc., from one or more client devices 130 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from client devices 130 so that client devices 130 do not need to know exactly where or how the content items are being stored by content management system 806. In some embodiments, content management system 806 can store the content items in the same collection hierarchy as they appear on client device 130X. However, content management system 806 can store the content items in its own order, arrangement, or hierarchy. Content management system 806 can store the content items in a network accessible storage (NAS) device, in a redundant array of independent disks (RAID), etc. Content storage 860 can store content items using one or more partition types, such as FAT, FAT32, NTFS, EXT2, EXT3, EXT4, HFS/HFS+, BTRFS, and so forth.

Content storage 860 can also store metadata describing content items, content item types, and the relationship of content items to various accounts, collections, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate content items or duplicate segments of content items. Instead of storing multiple copies, content storage 860 can store a single copy and then use a pointer or other mechanism to link the duplicates to the single copy. Similarly, content storage 860 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 806 can be configured to support automatic synchronization of content items from one or more client devices 130. The synchronization can be platform agnostic. That is, the content items can be synchronized across multiple client devices 130 of varying type, capabilities, operating systems, etc. For example, client device 130X can include client software, which synchronizes, via a synchronization module 832 at content management system 806, content in client device 130X's file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, an end-user can manipulate content items directly in a local collection, while a background process monitors the local collection for changes and synchronizes those changes to content management system 806. Conversely, the background process can identify content items that have been updated at content management system 806 and synchronize those changes to the local collection. The client software can provide notifications of synchronization operations, and can provide indications of content statuses directly within the content management application. Sometimes client device 130X may not have a network connection available. In this scenario, the client software can monitor the linked collection for content item changes and queue those changes for later synchronization to content management system 806 when a network connection is available. Similarly, an end-user can manually start, stop, pause, or resume synchronization with content management system 806.

An end-user can view or manipulate content via a web interface generated and served by user interface module 822. For example, the end-user can navigate in a web browser to a web address provided by content management system 806. Changes or updates to content in the content storage 860 made through the web interface, such as uploading a new version of a content item, can be propagated back to other client devices 130 associated with the end-user's account. For example, multiple client devices 130, each with their own client software, can be associated with a single account and content items in the account can be synchronized between each of the multiple client devices 130.

Content management system 806 can include a communications interface 820 for interfacing with various client devices 130, and can interact with other content and/or service providers 809-1, 809-2, . . . , 809-N (collectively "1009") via an Application Program Interface (API). Certain software applications can access content storage 860 via an API on behalf of an end-user. For example, a software package, such as an app running on a smartphone or tablet computing device, can programmatically make calls directly to content management system 806, when an end-user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific client devices, and so forth, to ensure only authorized clients and users can access content items. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any computing device in network communication with content management system 806. Sharing content privately can include linking a content item in content storage 860 with two or more user accounts so that each user account has access to the content item. The sharing can be performed in a platform agnostic manner. That is, the content can be shared across multiple client devices 130 of varying type, capabilities, operating systems, etc. The content can also be shared across varying types of user accounts.

In some embodiments, content management system 806 can be configured to maintain a content directory identifying the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 1 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 1 or true. Thus, access to a content item for which a URL has been generated can be easily restricted by changing the value of the URL active flag. This allows an end-user to restrict access to the shared content item without having to move the content item or delete the generated URL. Likewise, sharing module 830 can reactivate the URL by again changing the value of the URL active flag to 1 or true. An end-user can thus easily restore access to the content item without the need to generate a new URL.

While content management system 806 is presented with specific components, it should be understood by one skilled in the art, that the architectural configuration of system 806 is simply one possible configuration and that other configurations with more or fewer components are possible.

11. Hardware Overview

A process, service, or application comprises a combination of the software and allocation of resources from a machine node. Specifically, a process, service, or application is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function, e.g., on behalf of one or more clients.

One or more of the functions attributed to any process described herein, may be performed by any other logical entity that may or may not be depicted in FIG. 1, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
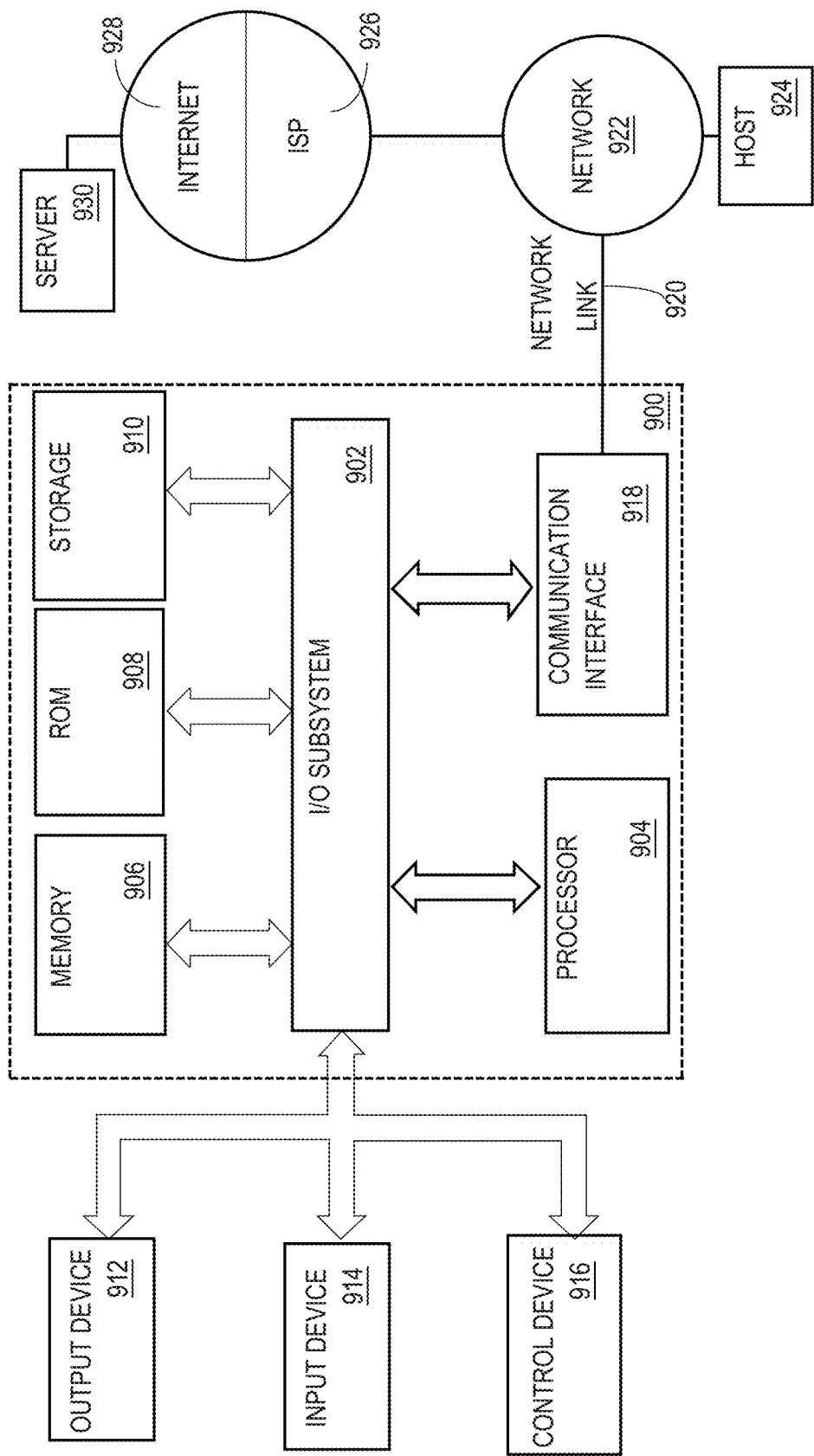
FIG. 9 illustrates an example computing device with which techniques described herein may be implemented.

For example, FIG. 9 is a block diagram that illustrates a computer system 900 upon which some embodiments of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

12. Conclusion

Reference herein to "some embodiments" or "some embodiments" means that a particular feature, structure, or characteristic is described in connection with and can be included in at least one embodiment of the invention. The appearances of the phrase "in some embodiments" in various places in the specification are not necessarily all referring to the same embodiment or embodiments, nor are separate or alternative embodiments mutually exclusive of other embodiments.

Although some of various drawings illustrate a number of logical stages in a particular order, stages that are not order dependent may be reordered and other stages may be combined or broken out. While some reordering or other groupings are specifically mentioned, the ordering and groupings presented herein are not an exhaustive list of alternatives.

In the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing detailed description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed by one or more computing devices, the method comprising:
   streaming video data to a plurality of client devices participating in a session, the video data representing a plurality of video frames;
   during the streaming, recording state information about the video data, the state information including:
      real-time cursor data indicating a position of an input cursor controlled within a graphical user interface at each of the client devices,
      drawing annotations provided by client devices of the plurality of client devices participating in the session; and user interaction information reflecting an interaction of a user with a graphical user interface displayed at a first client device of the plurality of client devices, wherein the user interaction information identifies a particular action performed at the first client device or identifies a particular control in the graphical user interface displayed by the first client device from each of the one or more client devices of the plurality of client devices, receiving the real-time cursor data, wherein the real-time cursor data is time-synchronized with the video data streamed during the session;

transmitting, in real time to each client device of the plurality of client devices, the real-time cursor data received from other client devices of the plurality of client devices, wherein each client device in synchronous mode is configured to display, in real time, respective cursors representing each input cursor controlled at the other client devices at respective locations indicated in the real-time cursor data, and wherein, upon one of the plurality of client devices changing from the synchronous mode to an asynchronous mode, ceasing to display, within the graphical user interface of each client device in the synchronous mode, a cursor representing an input cursor controlled at the one of the plurality of client devices; and wherein each client device in a synchronous mode is configured to display, in real time, a visual representation of the user interaction information, wherein when the user interaction information identifies the particular control in the graphical user interface displayed by the first client device, the visual representation of the user interaction information comprises a visual highlight of the particular control.

2. The method of claim 1, further comprising:

receiving, from a first client device of the plurality of client devices, drawing instructions for recreating a first annotation performed, at the first client device, on a particular frame of the plurality of video frames; and transmitting, to each client device of the plurality of client devices other than the particular client device, the drawing instructions, wherein each client device in synchronous mode is configured to draw, in real-time, based on the drawing instructions, the first annotation on the particular frame displayed at each client device, and wherein each client device in the asynchronous mode is configured to draw the first annotation on the particular frame when the particular frame is played back in other than real time and independent of the session, the first annotation being drawn on the particular frame using the state information recorded local to each client device in the asynchronous mode.

3. The method of claim 2, further comprising, after transmitting the drawing instructions:

receiving second drawing instructions, from the first client device, for recreating the first annotation; and responsive to receiving the second drawing instructions, transmitting, in real time to each client device of the plurality of client devices other than the first client device, the second drawing instructions.

4. The method of claim 2, wherein the receiving, from the first client device, the drawing instructions is based on a user command to transmit the drawing instructions.

5. The method of claim 2, further comprising:

storing, in session data associated with the video data, a plurality of drawing instructions for drawing annotations received while streaming the video data to the plurality of client devices, wherein the plurality of drawing instructions comprises the drawing instructions;

receiving a request to review the session data from a requesting client device; and providing the session data to the requesting client device as a response to the request, the requesting client device being configured to draw, based on the plurality of drawing instructions in the session data, the drawing annotations on associated video frames displayed at the requesting client device.

6. The method of claim 5, further comprising:

storing, in the session data, a plurality of timestamps associated with the plurality of drawing instructions, the plurality of timestamps reflecting timing of receipt of respective drawing instructions of the plurality of drawing instructions, wherein the requesting client device is configured to draw the drawing annotations timed according to the plurality of timestamps.

7. The method of claim 6, further comprising:

storing, in the session data, video playback instructions received from the plurality of client devices with respective timestamps reflecting timing of receipt of respective video playback instructions of the video playback instructions, wherein the requesting client device is further configured to perform the video playback instructions timed according to the respective timestamps.

8. The method of claim 7, further comprising:

storing, in the session data, the real-time cursor data received from each client device of the client devices, wherein each cursor position datum in the session data is associated with a timestamp of receipt of each cursor position datum, and wherein the requesting client device is further configured to display input cursor representations based on the real-time cursor data in the session data.

9. The method of claim 2, wherein:

the streaming of the video data to the plurality of client devices is performed in connection with a first streaming session, and the method further comprises:

storing, in first session data for the first streaming session of the video data, the drawing instructions associated with the particular frame;

storing, in second session data for a second streaming session of the video data, second drawing instructions, associated with the particular frame, for recreating a second drawing annotation performed on the particular frame by a second client device; and after storing the first session data and the second session data:

in connection with streaming the video data, causing display of the particular frame at a third client device; and transmitting, to the third client device, the drawing instructions and the second drawing instructions, the third client device being configured to draw, based on the drawing instructions and the second drawing instructions, the particular drawing annotation and the second drawing annotation on the particular frame displayed at the third client device.

10. The method of claim 2, further comprising wherein:
receiving, from a second client device of the plurality of client devices, second drawing instructions for recreating a second drawing annotation performed, at the second client device, on the particular frame; and
transmitting, to each client device of the plurality of client devices other than the second client device, the second drawing instructions, each client device being configured to draw, based on the second drawing instructions, the second drawing annotation on the particular frame displayed at each client device.

11. The method of claim 1, wherein the cursors are visually associated, respectively, with information identifying respective users associated with each input cursor.

12. One or more non-transitory computer-readable media storing one or more sequences of instructions that, when executed by one or more processors, cause the one or more processors to:
stream video data to a plurality of client devices participating in a session, the video data representing a plurality of video frames;
record state information about the video data, the state information including:
real-time cursor data indicating a position of an input cursor controlled within a graphical user interface at each of the client devices,
annotations provided by client devices of the plurality of client devices participating in the session, and
user interaction information reflecting an interaction of a user with a graphical user interface displayed at a first client device of the plurality of client devices, wherein the user interaction information identifies a particular action performed at the first client device or identifies a particular control in the graphical user interface displayed by the first client device;
from each of the client devices of the plurality of client devices, receive the real-time cursor data, wherein the real-time cursor data is time-synchronized with the video data streamed during the session;
transmit, in real time to each client device of the plurality of client devices, the real-time cursor data received from other client devices of the plurality of client devices,
wherein each client device in synchronous mode is configured to display, in real time, respective cursors representing each input cursor controlled at the other client devices at respective locations indicated in the real-time cursor data,
wherein, upon one of the plurality of client devices changing from the synchronous mode to an asynchronous mode, ceasing to display, within the graphical user interface of each client device in the synchronous mode, a cursor representing of an input cursor controlled at the one of the plurality of client devices, and
wherein each client device in a synchronous mode is configured to display, in real time, a visual representation of the user interaction information, wherein when the user interaction information identifies the particular control in the graphical user interface displayed by the first client device, the visual representation of the user interaction information comprises a visual highlight of the particular control.

13. The one or more non-transitory computer-readable media of claim 12, further comprising:
receive, from a first client device of the plurality of client devices, user interaction information reflecting a user interaction with the graphical user interface displayed by the first client device, wherein the user interaction information includes drawing instructions for recreating a first annotation, at the first client device, on a particular frame of the plurality of video frames; and
in response to receiving the user interaction information, transmit, to each client device of the plurality of client devices other than the first client device, the user interaction information,
wherein each client device in synchronous mode is configured to display, in real-time, a visual representation of the user interaction information, by applying the drawing instructions to draw the first annotation on the particular frame displayed at each client device,
wherein each client device in the asynchronous mode for the session is configured to display the first annotation performed on the particular frame when the particular frame is played back in other than real time and independent of the session, the first annotation being drawn on the particular frame using the state information recorded local to each client device.

14. The one or more non-transitory computer-readable media of claim 13, wherein
the user interaction information identifies a particular control in the graphical user interface displayed by the first client device,
for each client device of the plurality of client devices other than the first client device, the visual representation of the user interaction information comprises a visual highlight of a corres ponding graphical interface control, and
the user interaction information indicates that the input cursor at the first client device rolled over the particular control.

15. The one or more non-transitory computer-readable media of claim 13, wherein:
the user interaction information identifies a particular action performed at the first client device, and
for each client device of the plurality of client devices other than the first client device, the visual representation of the user interaction information comprises text data that indicates the particular action and a user identifier associated with the first client device.

16. The one or more non-transitory computer-readable media of claim 13, wherein:
the user interaction with the graphical user interface displayed by the first client device comprises an instruction to:
affect video playback,
add an annotation to the video data,
enter/exit stealth mode,
enter/exit the asynchronous mode, or
enter/exit drawing suppression mode; and
the one or more sequences of instructions further comprise instructions which, when executed by the one or more processors, cause, in response to receiving the user interaction information, the one or more processors to:
request, from a session master, permission to follow the instruction; and
receive, from the session master, permission to follow the instruction,
wherein the one or more processors transmit the user interaction information in response to receiving the permission to follow the instruction.

17. A computing system comprising:
one or more processors;
one or more non-transitory computer-readable media; and one or more sequences of instructions stored in the one or more non-transitory computer-readable media which, when executed by the one or more processors, cause the computing system to:
- stream video data to a plurality of client devices participating in a session, the video data representing a plurality of video frames;
- record state information about the video data, the state information including:
  - user interaction information reflecting an interaction of a user with a graphical user interface displayed at a first client device of the plurality of client devices, the user interaction information identifying a particular action performed at the first client device or identifies a particular control in the graphical user interface displayed by the first client device,
  - real-time cursor data indicating a position of an input cursor controlled within the graphical user interface at each of the client devices, and
  - annotations provided by client devices of the plurality of client devices participating in the session;
- receive, from the first client device, the user interaction information, wherein the user interaction information is time-synchronized with the video data streamed during the session;
- transmit, in real time to each client device of the plurality of client devices, the real-time cursor data received from other client devices of the plurality of client devices,
- in response to receiving the user interaction information, transmit, to each client device of the plurality of client devices other than the first client device, the user interaction information,
- wherein each client device in a synchronous mode is configured to display, in real time a visual representation of the user interaction information including the respective cursors represented by the real-time cursor data,
- wherein, upon one of the plurality of client devices changing from the synchronous mode to an asynchronous mode, ceasing to display, within the graphical user interface of each client device in the synchronous mode, a visual representation of the user interaction information of the one of the plurality of client devices, and
- wherein when the user interaction information identifies the particular control in the graphical user interface displayed by the first client device, the visual representation of the user interaction information comprises a visual highlight of a graphical interface control.

18. The computing system of claim 17, wherein, when executed by the one or more processors, the one or more sequences of instructions stored in the one or more non-transitory computer-readable media further cause the computing system to:
- receive, from a second client device of the plurality of client devices, one or more drawing instructions, for recreating a first annotation performed, at the second client device, on a particularframe of the plurality of video frames; and
- transmit, to each client device of the plurality of client devices other than the second client device, the one or more drawing instructions,
- wherein each client device in the synchronous mode is configured to draw, in real-time, based on the one or more drawing instructions, the first annotation on the particularframe, and
- wherein each client device in the asynchronous mode is configured to display the first annotation on the particularframe, which is played back in other than real time, the first annotation being drawn on the particular frame using the state information recorded local to each client device in the asynchronous mode.

19. The computing system of claim 17, wherein:
when the user interaction information identifies the particular action performed at the first client device, the visual representation of the user interaction information comprises text data that indicates the particular action and a user identifier associated with the first client device.

20. The computing system of claim 18, wherein the one or more sequences of instructions further comprise instructions which, when executed by the one or more processors, cause the computing system to:
- receive, from the second client device of the plurality of client devices, second drawing instructions for recreating a second drawing annotation performed, at the second client device, on the particularframe; and
- transmit, to each client device of the plurality of client devices other than the second client device, the second drawing instructions, wherein each client device is configured to draw, based on the second drawing instructions, the second drawing annotation on the particular frame displayed at each client device.

* * * * *